(12) United States Patent
Sekine et al.

(10) Patent No.: US 8,782,891 B2
(45) Date of Patent: Jul. 22, 2014

(54) APPARATUS FOR TEMPORARILY ASSEMBLING HEAT EXCHANGER

(75) Inventors: Akira Sekine, Oyama (JP); Takashi Tamura, Oyama (JP)

(73) Assignee: Keihin Thermal Technology Corporation, Oyama-shi (JP)

( * ) Notice: Subject to any disclaimer, the term of this patent is extended or adjusted under 35 U.S.C. 154(b) by 499 days.

(21) Appl. No.: 12/942,085

(22) Filed: Nov. 9, 2010

(65) Prior Publication Data

US 2011/0047797 A1    Mar. 3, 2011

Related U.S. Application Data

(62) Division of application No. 10/549,286, filed as application No. PCT/JP2004/003697 on Mar. 18, 2004, now abandoned.

(60) Provisional application No. 60/465,788, filed on Apr. 28, 2003.

(30) Foreign Application Priority Data

Mar. 18, 2003 (JP) ................................. 2003-074236

(51) Int. Cl.
  *B21D 53/06*   (2006.01)
  *B23P 15/26*   (2006.01)
(52) U.S. Cl.
  USPC ...................... 29/890.035; 29/890.03; 29/726; 29/726.5
(58) Field of Classification Search
  USPC ......................... 29/726–727, 890.03–890.054
  See application file for complete search history.

(56) References Cited

U.S. PATENT DOCUMENTS 4,611,375 A * 9/1986 Zapawa ................... 29/890.046

FOREIGN PATENT DOCUMENTS

| JP | 60-207731 | 10/1985 |
| JP | 61-111633 | 7/1986 |
| JP | 3-102197 | 4/1991 |
| JP | 5-7958 | 1/1993 |
| JP | 5-007958 A | 1/1993 |
| JP | 2002-205228 | 7/2002 |
| JP | 2003-53460 | 2/2003 |
| WO | WO 02/100567 A1 | 12/2002 |
| WO | WO 2004/039515 A1 | 5/2004 |

OTHER PUBLICATIONS

Office Action issued on May 20, 2009, in Japanese Patent Application No. 2004-077413.

(Continued)

*Primary Examiner* — Richard Chang
(74) *Attorney, Agent, or Firm* — Oblon, Spivak, McClelland, Maier & Neustadt, L.L.P.

(57) ABSTRACT

A temporary assembly apparatus includes a support member for supporting heat exchange tube blanks having their lengthwise direction positioned laterally, with their widthwise direction positioned vertically. Header supports are arranged respectively at the left and right sides of the support member and movable leftward or rightward. Tube blank correcting members are each in the form of a plate having slits formed in a side edge thereof and arranged from the front rearward at the same spacing as the heat exchange tubes to be produced. Each of the blank correcting members is movable between a correcting position where the corresponding ends of the tube blanks as supported on the support member are fitted into the respective slits and a noncorrecting position where the tube blanks are not fitted into the slits.

11 Claims, 16 Drawing Sheets

(56) References Cited

OTHER PUBLICATIONS

Office Action issued on Jan. 25, 2010, in Japanese Patent Application No. 2004-077413.

Supplementary European Search Report issued Oct. 22, 2010, in Patent Application No. 04 72 1632.0.

* cited by examiner

APPARATUS FOR TEMPORARILY ASSEMBLING HEAT EXCHANGER

CROSS REFERENCE TO RELATED APPLICATIONS

This application is a divisional of and claims benefit of priority from U.S. application Ser. No. 10/549,286, filed Jun. 19, 2006, the entire contents of which are hereby incorporated by reference. U.S. application Ser. No. 10/549,286 is a national stage of PCT/JP2004/03697, filed Mar. 18, 2004, which claims the benefit pursuant to 35 U.S.C. §119 (e) (1) and priority of U.S. Provisional Application Ser. No. 60/465,788, filed Apr. 28, 2003 under 35 U.S.C. §111(b). U.S. application Ser. No. 10/549,286 further claims the benefit of priority from the Japanese Patent Application No. 2003-074236, filed Mar. 18, 2003.

TECHNICAL FIELD

The present invention relates to tube blank correcting members for use in temporarily assembling heat exchangers, and an apparatus for and a method of temporarily assembling heat exchangers. More particularly, the invention relates to a tube blank correcting member, and temporarily assembling apparatus and method for use in fabricating heat exchangers which comprise a pair of headers arranged in parallel and spaced apart from each other, a plurality of flat heat exchanger tubes arranged in parallel between the headers and brazed at opposite ends to the respective headers with the tube ends placed into respective insertion holes formed in the headers, and fins each arranged between and brazed to each pair of adjacent heat exchange tubes, and which are useful, for example, as condensers or evaporators for motor vehicle air conditioners, motor vehicle oil coolers and motor vehicle radiators, the tube blank correcting member and the temporarily assembling apparatus and method being adapted for use in temporarily assembling the headers, flat heat exchange tube blanks and the fins into a unit to be brazed.

The term "aluminum" as used herein and in the appended claims includes aluminum alloys in addition to pure aluminum. The upper, lower, left and right sides of FIG. 2 will be herein referred to respectively as "upper," "lower," "left" and "right," and the lower and upper sides of FIG. 1 as "front" and "rear."

BACKGROUND ART

Widely used, for example, in motor vehicle air conditioners in place of conventional serpentine condensers are condensers which comprise, as shown in FIG. 13, a pair of headers 50, 51 arranged in parallel and spaced apart from each other, parallel flat heat exchange tubes 52 made of aluminum and each joined at its opposite ends to the two headers 50, 51, corrugated aluminum fins 53 each disposed in an air flow clearance between the adjacent heat exchange tubes 52 and brazed to the adjacent tubes 52, an inlet pipe 54 connected to the upper end of peripheral wall of the first 50 of the headers, an outlet pipe 55 connected to the lower end of peripheral wall of the second 51 of the headers, a first partition 56 provided inside the first header 50 and positioned above the midportion thereof, and a second partition 57 provided inside the second header 51 and positioned below the midportion thereof, the number of heat exchange tubes 52 between the inlet pipe 54 and the first partition 56, the number of heat exchange tubes 52 between the first partition 56 and the second partition 57 and the number of heat exchange tubes 52 between the second partition 57 and the outlet pipe 55 decreasing from above downward to provide groups of channels. A refrigerant flowing into the inlet pipe 54 in a vapor phase flows zigzag through the channel groups as units within the condenser before flowing out from the outlet pipe 55 in a liquid phase. The condensers of the construction described are called multiflow condensers, and realize high efficiencies, lower pressure losses and supercompactness (see, for example, the publication of JP-A No. 1994-281373).

It is required that the heat exchange tube 52 of the condenser described be excellent in heat exchange efficiency and have pressure resistance against the high-pressure gaseous refrigerant to be introduced thereinto. Moreover, the tube needs to be small in wall thickness and low in height so as to make the condenser compact.

As disclosed in the above publication, the heat exchange tube 52 which is excellent in heat exchange efficiency for use in such condensers comprises two flat walls which are parallel to each other, opposite side walls interconnecting the two flat walls at the respective opposite side edges thereof, and a plurality of reinforcing walls interconnecting the two flat walls, extending longitudinally of the tube and spaced apart from one another as positioned between the opposite side walls, the tube having parallel fluid channels formed inside thereof, each of the reinforcing walls being formed from a ridge projecting inward from one of the flat walls integrally therewith and a ridge projecting inward from the other flat wall integrally therewith by brazing the two ridges to each other as positioned end-to-end.

Such a flat heat exchange tube is fabricated from a metal plate having two first portions 60 for making the flat walls, a second portion 61 interconnecting the first portions 60 for forming one of the side walls, two third portions 62 projecting from the respective first portions 60 integrally therewith each at a side edge thereof opposite to the second portion 61 for making the other side wall, and a plurality of ridges 63 formed on each first portion 60 integrally therewith, arranged at a spacing widthwise thereof and projecting in the same direction as the third portion 62, by bending the metal plate to the shape of a hairpin at the second portion 61 to place the third portions 62, as well as the opposed ridges 63 in each pair, end to end and obtain a heat exchange tube blank P (see FIG. 14), and brazing the third portions 62 of the blank P to each other and the opposed ridges 63 thereof in each pair to each other. To prevent the third portions 62 from separating from each other in the heat exchange tube blank P, a ridge 64 formed in the end face of one of the third portions 62 is forced into a furrow 65 formed in the end face of the other third portion 62 by a press fit. Before the metal plate is bent to form the tube blank P, each ridge 63 on one of the first portions 60 and the corresponding ridge 63 on the other first portion 60 are positioned symmetrically about the widthwise center line of the metal plate.

For example, the publication of JP-A No. 1993-7958 discloses an apparatus for use in temporarily assembling headers, flat heat exchange tube blanks and fins into a unit which is to be brazed to fabricate such a condenser as described above. This apparatus comprises a guide fixedly mounted on a work table and provided in its upper side with a plurality of blank grooves extending laterally of the table and having a width corresponding to the thickness of the tube blanks, and a pair of header supports provided on the work table respectively at the left and right sides of the guide and movable toward or away from each other.

The headers, heat exchange tube blanks and fins are temporarily assembled in the following manner using this apparatus. One end of one of the tube blanks is placed into an insertion hole of one of the headers, and the other end of another one of the tube blanks is placed into an insertion hole of the other header. All the remaining tube blanks are fitted into respective blank grooves of the guide. The headers are then arranged on the respective header supports. The header supports are subsequently moved toward each other, whereby opposite ends of the tube blanks are placed into respective insertion holes of the headers. The headers and the heat exchange tube blanks are thereafter removed from the header supports and the guide, and corrugated fins are arranged between the adjacent tube blanks. In this way, the headers, heat exchange tube blanks and fins are temporarily assembled into a unit.

However when the heat exchange tube blank P shown in FIG. 14 is used as the tube blank, we have found that the following problem is encountered with the conventional temporarily assembling apparatus.

Such heat exchange tube blanks P are produced by cutting an elongated heat exchange tube blank into predetermined lengths while continuously forming the elongated tube blank, so that the cutting force is likely to cause the ridge 64 to slip off from the furrow 65 at the cut end portion, permitting the third portions 62 of the tube blank P to separate from each other and form an opening. This gives the end portion of the tube blank P a thickness T which is greater than the width S of the insertion hole H1 formed in the header H, with the result that the end portion of the tube blank P can not be placed into the insertion hole H1 of the header H.

An object of the present invention is to overcome the above problem and to provide a tube blank correcting member for use in temporarily assembling heat exchangers which makes it possible to reliably insert the corresponding ends of heat exchange tube blanks into respective insertion holes of a header, and a temporarily assembling apparatus and method for heat exchangers.

DISCLOSURE OF THE INVENTION

The present invention provides a tube blank correcting member for use in fabricating a heat exchanger comprising a pair of headers arranged in parallel and spaced apart from each other, a plurality of flat heat exchange tubes arranged in parallel between the headers and brazed at opposite ends to the respective headers with the tube ends placed into respective insertion holes formed in the headers, and fins each arranged between and brazed to each pair of adjacent heat exchange tubes. The blank correcting member for temporarily assembling the heat exchanger, i.e., for use in temporarily assembling the headers, flat heat exchange tube blanks and the fins into a unit to be brazed, extends from front rearward and has a plurality of blank fitting slits formed in a side edge thereof and arranged from the front rearward at the same spacing as the heat exchange tubes to be produced of the heat exchanger.

The heat exchange tube blank is made from a metal plate which has, for example, two first portions for making flat walls, a second portion interconnecting the first portions for forming one of side walls, and two third portions projecting from the respective first portions integrally therewith each at a side edge thereof opposite to the second portion for making the other side wall, by bending the metal plate to the shape of a hairpin at the second portion to place the third portions end to end. Even if the third portions open relative to each other at opposite end portions to give each end of the tube blank a thickness greater than the width of the insertion hole of the header, the third portions can be butted against each other and closed to give the blank end a thickness permitting the blank end to be placed into the insertion hole, by arranging such tube blanks from front rearward in parallel, with their lengthwise direction positioned laterally and their widthwise direction positioned vertically, while aligning opposite left and right ends thereof respectively, and fitting the opposite ends of the tube blanks into the slits of respective blank correcting members. Further in the case where the tube blank has a bulging widthwise intermediate portion, the bulging portion can be corrected by fitting the blank into the slit of the correcting member.

With the tube blank correcting member of the invention, each of the blank fitting slits has an opening with a width larger than the maximum thickness of the flat heat exchange tube blank, and an open end portion of the slit flares toward the opening with a gradually increasing width. The slit open end portion flaring toward the opening with a gradually increasing width provides a tapering portion, and the tapering portion preferably has a taper angle of 10 to 20 deg. Even if each of the left and right ends of the tube blank then has a thickness larger than the insertion hole of the header, the blank end can be fitted smoothly into the blank fitting slit of the corresponding correcting member in this case. Moreover, the blank end can be smoothly fitted into the slit regardless of whether the third portions are positioned down or up. Further in the case where the tube blank has a bulging widthwise intermediate portion, the bulging portion can be corrected by fitting the blank into the slit of the correcting member.

With the tube blank correcting member wherein the slit open end portion is in the form of a tapering portion, the slit may have a portion other than the tapering portion and having a depth not smaller than the width of the tube blank. Each of left and right ends of the tube blank can then be made to have a thickness permitting the blank end to be placed into the insertion hole of the header regardless of whether the third portions are positioned down or up.

The present invention provides a heat exchanger temporarily assembling apparatus for use in fabricating a heat exchanger comprising a pair of headers arranged in parallel and spaced apart from each other, a plurality of flat heat exchange tubes arranged in parallel between the headers and brazed at opposite ends to the respective headers with the tube ends placed into respective insertion holes formed in the headers, and fins each arranged between and brazed to each pair of adjacent heat exchange tubes. The apparatus is adapted for use in temporarily assembling the heat exchanger, i.e., for use in temporarily assembling the headers, flat heat exchange tube blanks and the fins into a unit to be brazed, comprises a support member for supporting thereon the heat exchange tube blanks arranged from front rearward in parallel with their lengthwise direction positioned laterally, with their widthwise direction positioned vertically, and with opposite left and right ends thereof aligned respectively, and the fins arranged between the respective pairs of adjacent tube blanks, two header supports arranged respectively at left and right sides of the support member and movable leftward or rightward, and a pair of left and right tube blank correcting members each extending from the front rearward and having a plurality of blank fitting slits formed in a side edge thereof and arranged from the front rearward at the same spacing as the heat exchange tubes to be produced of the heat exchanger, each of the tube blank correcting members being movable between a correcting position wherein the corresponding ends of all the tube blanks as supported on the support member are fitted into the respective slits and a noncorrecting position wherein the tube blanks are not fitted into the slits.

The heat exchange tube blank is made from a metal plate which has, for example, two first portions for making flat walls, a second portion interconnecting the first portions for forming one of side walls, and two third portions projecting from the respective first portions integrally therewith each at a side edge thereof opposite to the second portion for making the other side wall, by bending the metal plate to the shape of a hairpin at the second portion to place the third portions end to end. Even if the third portions open relative to each other at opposite end portions to give each end of the tube blank a thickness greater than the width of the insertion hole of the header, the third portions can be butted against each other and closed to give the blank end a thickness permitting the blank end to be placed into the insertion hole, by causing the support member to support thereon such tube blanks from front rearward in parallel, with their lengthwise direction positioned laterally, with their widthwise direction positioned vertically, and with opposite left and right ends thereof aligned respectively, and fins as arranged between the respective pairs of adjacent tube blanks, moving the blank correcting members from their noncorrecting position to the correcting position and thereby fitting the opposite ends of the tube blanks into the slits of respective blank correcting members. Further in the case where the tube blank has a bulging widthwise intermediate portion, the bulging portion can be corrected by fitting the blank into the slit of the correcting member.

With the heat exchanger temporarily assembling apparatus of the invention, each of the blank fitting slits has an opening with a width larger than the maximum thickness of the flat heat exchange tube blank, and an open end portion of the slit flares toward the opening with a gradually increasing width. The slit open end portion flaring toward the opening with a gradually increasing width provides a tapering portion, and the tapering portion preferably has a taper angle of 10 to 20 deg. Even if each of the left and right ends of the tube blank then has a thickness larger than the insertion hole of the header, the blank end can be fitted smoothly into the blank fitting slit of the corresponding correcting member in this case. Moreover, the blank end can be smoothly fitted into the slit regardless of whether the third portions are positioned down or up. Further in the case where the tube blank has a bulging widthwise intermediate portion, the bulging portion can be corrected by fitting the blank into the slit of the correcting member.

With the temporarily assembling apparatus wherein the slit open end portion of the tube blank correcting member is in the form of a tapering portion, the slit may have a portion other than the tapering portion and having a depth not smaller than the width of the tube blank. When the opposite ends of tube blanks are placed into the insertion holes of the respective headers in this case, the tube blank correcting members having the opposite ends of the tube blanks fitted into their slits are moved laterally inward by being pushed by the respective headers, so that the blank ends can be placed into the insertion holes free of trouble.

With the heat exchanger temporarily assembling apparatus of the invention, each tube blank correcting member is movable laterally when in the correcting position. When the opposite ends of the tube blanks are placed into the insertion holes of the respective headers in this case, the tube blank correcting members having the opposite ends of the tube blanks fitted into their slits are moved laterally inward by being pushed by the respective headers, so that the blank ends can be placed into the insertion holes free of trouble.

With the heat exchanger temporarily assembling apparatus of the invention, each tube blank correcting member is biased laterally outward by a biasing member when in the correcting position. When the blank correcting members are moved to their noncorrecting position after the opposite ends of the tube blanks are placed into the insertion holes of the respective headers, the correcting members are moved laterally outward to the original position by being moved laterally outward with the biasing force of the biasing members.

With the heat exchanger temporarily assembling apparatus of the invention, each of the tube blank correcting members is provided on a tube blank holding member extending from the front rearward, and the tube blank holding member is movable between a first position wherein the holding member is placed on corresponding left or right end portions of all the heat exchange tube blanks supported on the support member and a second position where the holding member is away from all the heat exchange tube blanks, the tube blank correcting member being movable upward or downward relative to the holding member when the holding member is in the first position, the blank correcting member assuming the correcting position when moved downward or assuming the noncorrecting position when moved upward. Preferably, the tube blank holding member is disposed laterally outwardly of the corresponding header support and fixed to a free end of an arm attached to a horizontal rod extending from the front rearward and pivotally movable about an axis of the rod, and the holding member is movable between the first position and the second position by the pivotal movement of the arm. When the tube blank correcting member is to be moved from the noncorrecting position to the correcting position, the blank holding member is in the first position, holding the corresponding ends of the tube blanks in this case, so that the tube blanks can be reliably fitted into the slits of the correcting member and reliably placed into the insertion holes of the corresponding header.

The temporarily assembling apparatus of the invention further includes the following constructions.

The support member comprises a pair of support tables spaced apart laterally of the apparatus, and a blank guide is provided between the support tables and movable upward or downward. When in a raised position, the blank guide has its upper surface positioned above the upper surface of the support member. The blank guide is provided in its upper surface with a plurality of fitting grooves extending laterally of the apparatus and arranged from the front rearward at a spacing larger than the spacing between the heat exchange tubes of the heat exchanger to be fabricated for placing respective heat exchange tube blanks thereinto. Preferably, the blank guide is fixedly provided with a receiving member at one of the front and rear ends thereof and has a pressure member disposed at the other end thereof and movable forward or rearward.

In fabricating a heat exchanger comprising a pair of headers arranged in parallel and spaced apart from each other, a plurality of flat heat exchange tubes arranged in parallel between the headers and brazed at opposite ends to the respective headers with the tube ends placed into respective insertion holes formed in the headers, and fins each arranged between and brazed to each pair of adjacent heat exchange tubes, each of the heat exchange tubes having a pair of flat walls opposed to each other and two side walls interconnecting the two flat walls respectively at opposite side edges thereof, the present invention provides a heat exchanger temporarily assembling method for use in temporarily assembling the headers, flat heat exchange tube blanks and the fins into a unit to be brazed, the heat exchanger temporarily assembling method using the apparatus described above and including: causing the support member to support thereon the heat exchange tube blanks arranged from front rearward in parallel with their lengthwise direction positioned laterally, with their widthwise direction positioned vertically, and with opposite left and right ends thereof aligned respectively, and the fins arranged between the respective pairs of adjacent tube blanks, placing the headers on the respective header supports as spaced apart from each other, moving each of the tube blank correcting members to the correcting position to place corresponding left or right ends of all the tube blanks on the support member into the respective blank fitting slits, and moving the two header supports laterally inward to place the opposite ends of the tube blanks into the respective insertion holes of the headers.

The heat exchange tube blank is made from a metal plate which has, for example, two first portions for making flat walls, a second portion interconnecting the first portions for forming one of side walls, and two third portions projecting from the respective first portions integrally therewith each at a side edge thereof opposite to the second portion for making the other side wall, by bending the metal plate to the shape of a hairpin at the second portion to place the third portions end to end. Even if the third portions open relative to each other at opposite end portions to give each end of the tube blank a thickness greater than the width of the insertion hole of the header, the third portions can be butted against each other and closed to give the blank end a thickness permitting the blank end to be placed into the insertion hole, by causing the support member to support thereon such tube blanks from front rearward in parallel, with their lengthwise direction positioned laterally, with their widthwise direction positioned vertically, and with opposite left and right ends thereof aligned respectively, and fins as arranged between the respective pairs of adjacent tube blanks, moving the blank correcting members from their noncorrecting position to the correcting position and thereby fitting the opposite ends of the tube blanks into the slits of respective blank correcting members.

With the heat exchanger temporarily assembling method of the invention, each of the heat exchange tube blanks is produced from a metal plate having two first portions for making the flat walls, a second portion interconnecting the first portions for forming one of the side walls, and two third portions projecting from the respective first portions integrally therewith each at a side edge thereof opposite to the second portion for making the other side wall, by bending the metal plate to the shape of a hairpin at the second portion to place the third portions end to end. The third portions of the metal plate are each made by forming this portion as projected from the first portion integrally therewith, or by bending a side edge portion of the first portion. The metal plate comprises, for example, an aluminum brazing sheet having a brazing material layer providing opposite surfaces thereof. In the case where the third portions are each formed as a projection on the first portion integral therewith, the metal plate is made by rolling the aluminum brazing sheet.

The present invention provides a process for fabricating a heat exchanger which process is characterized in that the headers, the heat exchange tube blanks and the fins temporarily assembled by the method described above are brazed.

The present invention provides a heat exchanger fabricated by brazing the headers, the heat exchange tube blanks and the fins temporarily assembled by the method described above.

The present invention provides a vehicle comprising a refrigeration cycle having a compressor, a condenser and an evaporator, the condenser comprising the heat exchanger described above.

BEST MODE OF CARRYING OUT THE INVENTION

Embodiments of the present invention will be described below with reference to the drawings.

Figure 1:
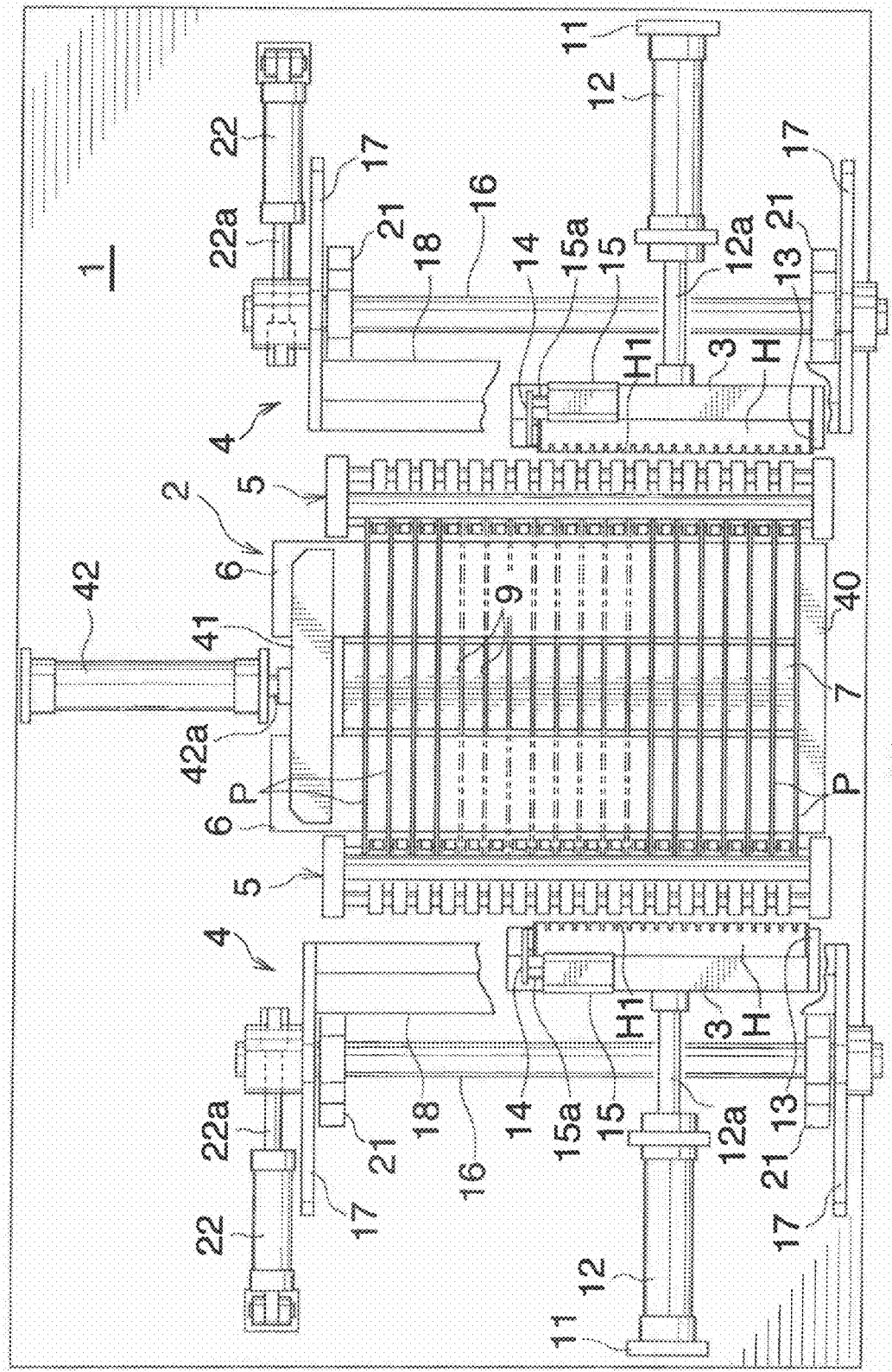
FIG. 1 is a plan view partly broken away and showing the overall construction of an apparatus of the invention for temporarily assembling a heat exchanger.
Figure 2:
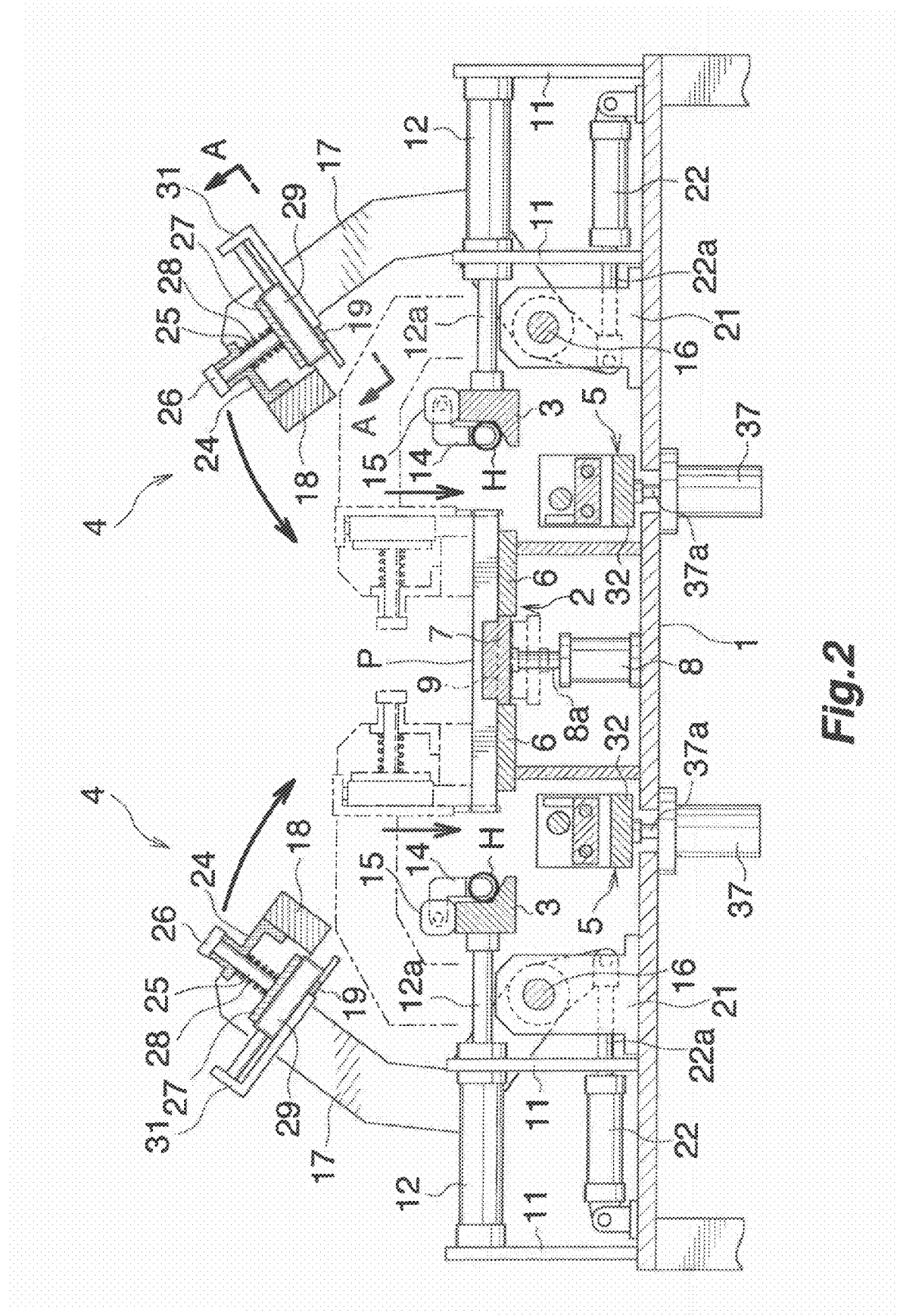
FIG. 2 is a view in vertical section showing the overall construction of the assembling apparatus of the invention as it is seen from the front.

FIGS. 1 and 2 show the overall construction of an apparatus of the invention for temporarily assembling a heat exchanger, and FIGS. 3 to 12 show the constructions of main parts of the apparatus.

Figure 3:
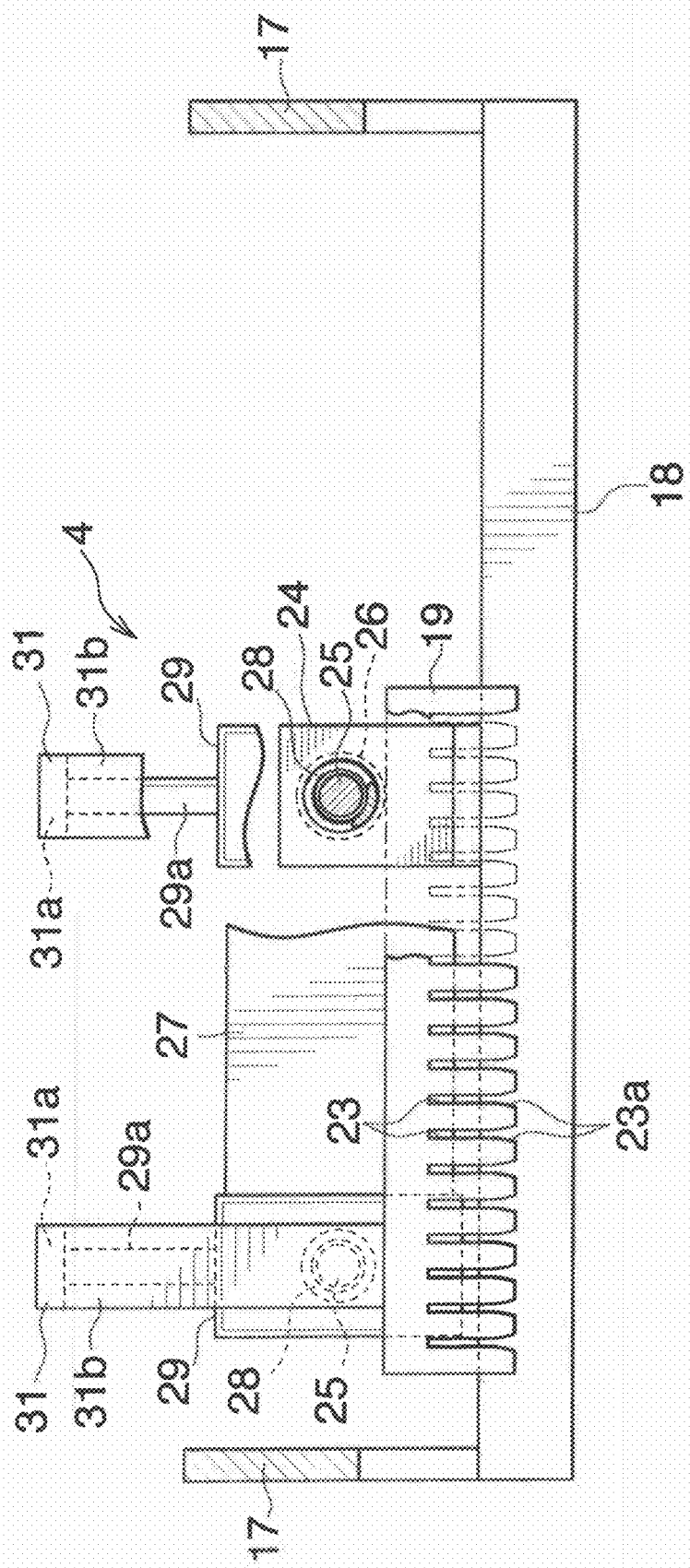
FIG. 3 is an enlarged view in section taken along the line A-A in FIG. 2.

With reference to FIGS. 1 to 3, the heat exchanger temporarily assembling apparatus comprises a support member 2 provided on a base 1 for supporting a plurality of flat heat exchange tube blanks P as arranged in parallel from the front rearward with their lengthwise direction positioned laterally and their widthwise direction positioned vertically, and corrugated fins each arranged between each pair of adjacent tube blanks P, header supports 3 extending from the front rearward, arranged respectively at the left and right sides of the support member 2 and movable leftward and rightward or laterally, holding-correcting devices 4 arranged respectively on the left and right sides of the support member 2 for holding the tube blanks P from above each at respective portions thereof away from the lengthwise midportion thereof closer to the left and right ends thereof and correcting the thickness of the tube blanks P each at the left and right ends thereof, and blank position adjusting devices 5 arranged respectively at the left and right sides of the support member 2 for adjusting the positions of opposite ends of each of the tube blanks P supported by the support member 2.

The support member 2 comprises a pair of left and right support tables 6 extending from the front rearward, spaced apart laterally of the apparatus and having respective flat upper surfaces which are positioned on the same horizontal plane. A pressure receiving plate 40 which is elongated laterally is fixedly connected between the front ends of the two support tables 6. Similarly, a pressure plate 41 which is elongated laterally is connected between the rear ends of the support plates 6 and movable forward or rearward. The pressure plate 41 is fixed to the forward end of the piston rod 42a of a hydraulic cylinder 42 facing forward and mounted by a suitable support member (not shown) on the base 1, and is moved forward or rearward by the advance or retraction of the piston rod 42a. A blank guide 7 extending from the front rearward is disposed between the two support tables 6 and movable upward or downward. The blank guide 7 is fixed to the upper end of the piston rod 8a of a hydraulic cylinder 8 facing upward and mounted on the base 1, and is movable upward or downward by the advance or retraction of the piston rod 8a. When the blank guide 7 is positioned as raised, the upper surface of the blank guide 7 is positioned above the upper surface of the support table 6, while conversely when the guide 7 is positioned as lowered, the upper surface of the guide 7 is positioned below that of the support table 6. The blank guide 7 is provided in its supper surface with a plurality of fitting grooves 9 for heat exchange tube blanks P extending laterally and having their widthwise direction positioned vertically to fit in, the grooves 9 being arranged from the front rearward at a spacing larger than the spacing between the heat exchange tubes of the heat exchanger to be fabricated. When the guide 7 is in its raised position, the bottom faces of the fitting grooves 9 are positioned at the same level as the upper surfaces of the support tables 6.

Each of the header supports 3 serves to support a header H with insertions holes H1 facing toward the tube blanks P at a level corresponding to the blanks P supported by the support member 2. The header support 3 is fixed to the forward end of the piston rod 12a of a hydraulic cylinder 12 facing laterally inward and attached to a pair of opposite cylinder brackets 11 fixed to the base 1 and projecting upward. The header support 3 is movable leftward or rightward by the advance or retraction of the piston rod 12a. Fixed to the front end of the header support 3 is a receiving plate 13 for the front end of the header H to bear on. The header support 23 is provided at its rear end with a pushing plate 14 movable forward or rearward for pushing the header H forward in contact with the rear end face of the header H. The pushing plate 14 is fixed to the free end of the piston rod 15a of a hydraulic cylinder 15 facing rearward and attached to the header support 3, and is movable forward or rearward by the retraction or advance of the piston rod 15a.

Each of the holding-correcting devices 4 comprises a horizontal rod 16 extending from the front rearward and disposed laterally outwardly of the header support 3 below the support 3, a pair of front and rear generally L-shaped arms 17 each attached at a portion close to a base end thereof to the horizontal rod 16 and rotatable about the axis of the rod 16, a blank holding member 18 extending from the front rearward, rectangular in cross section and fixedly connected between the free ends of the two arms 17, and a blank correcting member 19 attached to the blank holding member 18.

The horizontal rod 16 extends between and is fixed to a pair of front and rear rod brackets 21 fixed to and projecting upward from the base 1 and positioned respectively at the front and rear sides of the header support 3. The arms 17 are attached to the horizontal rod 16 at portions thereof projecting forward and rearward beyond the respective rod brackets 21, and are pivotally moved in the following manner. A hydraulic cylinder 22 facing laterally inward is supported at a laterally outer end thereof on a portion of the base 1 rearwardly of the rear arm bracket 21 so as to be pivotally movable about an axis extending from the front rearward. The free end of the piston rod 22a of the cylinder 22 is pivoted to the base end of the rear arm 17 so as to be pivotally movable about an axis extending from the front rearward. The arms 17 are pivotally moved about the axis of the horizontal rod 16 by the advance and retraction of the piston rod 22a.

The blank holding member 18 is movable by the pivotal movement of the arms 17 between a first position (as indicated by a chain line in FIG. 2) where the member 18 is placed on all the tube blanks P supported by the support member 2 at the portions thereof each slightly closer to the midportion of the blank than the corresponding left or right end and a second position (as indicated in a solid line in FIG. 2) away from all the blanks P.

The terms "upward," "downward," "left" and "right" as used hereinafter in connection with the blank holding member 18, the blank correcting member 19, and the portions and members relating to these members are used based on the case wherein the blank holding member 18 is in the first position.

Figure 8:
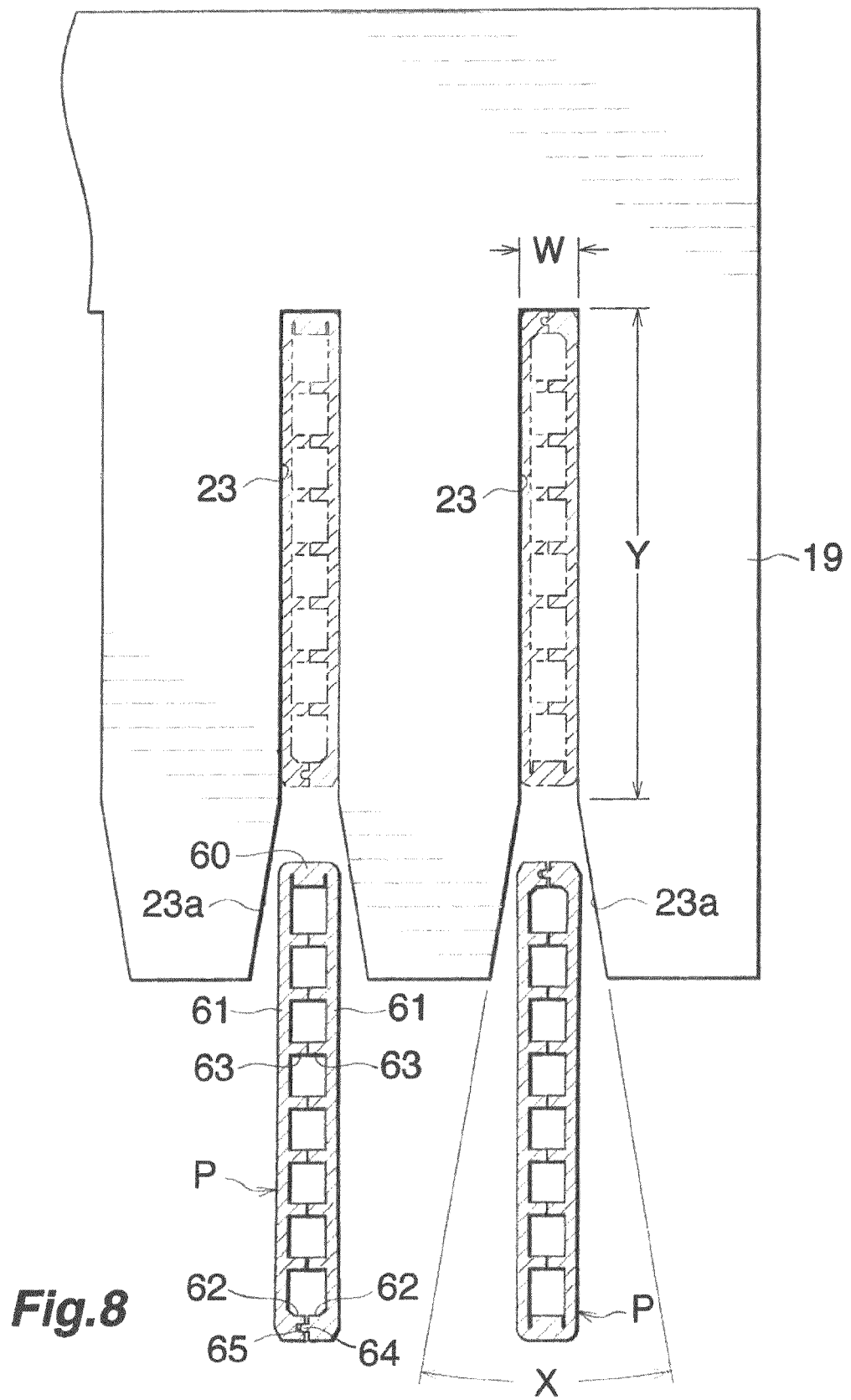
FIG. 8 is an enlarged fragmentary side elevation showing heat exchange tube blanks immediately before ends thereof are fitted into blank fitting slits.
Figure 15:
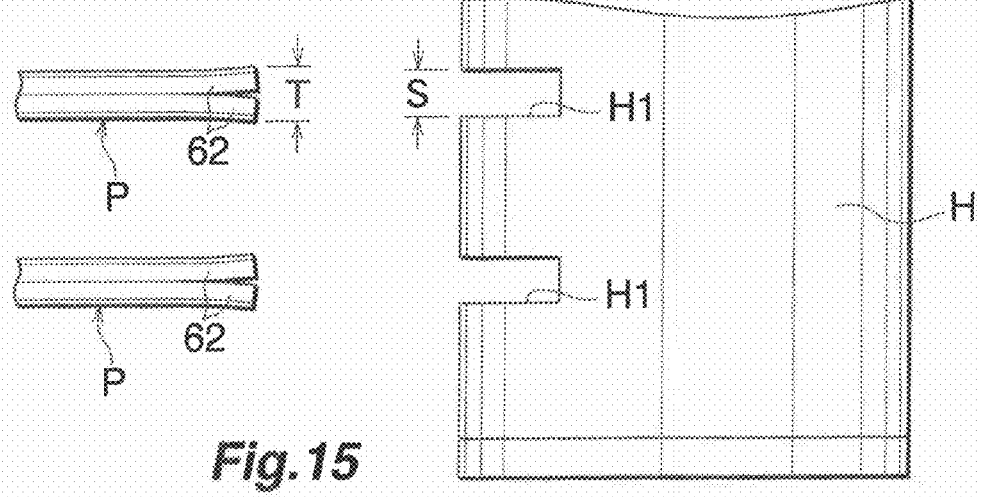
FIG. 15 is a fragmentary plan view showing the problem encountered when a conventional temporarily assembling apparatus is used.

The blank correcting member 19 is in the form of a plate extending from the front rearward and having blank fitting slits 23 formed in its lower edge at the same spacing as the heat exchange tubes of the heat exchanger to be fabricated. As shown in FIG. 8, the slits 23 have a width W which is preferably equal to the thickness of the tube blanks P but which may be about 0.1 mm larger than the thickness in view of ease of fitting the blanks P into the respective slits 23. If the slits are still larger, the left or right end of the tube plank P can not be dimensionally corrected in the direction of its thickness by being inserted into the slit 23, and it is likely that the end of the blank P can not be placed into the insertion hole H1 of the header H. The opening at the lower end of the blank fitting slit 23 has a width larger than the maximum thickness of the tube blank P. For example when the left or right end of the tube blank P is open, the width is larger than the thickness of the open end portion (see FIG. 15, T). The slit 23 has a lower end portion (open end portion) flaring downward (toward the opening) with a gradually increasing width, i.e. tapering upward. This tapering portion 23a preferably has a taper angle X of 10 to 20 deg. If this taper angle X is less than 10 deg, the left or right end of the tube blank P will not always fit into the slit 23 smoothly when the end is open. If the angle is in excess of 20 deg, the left or right end portion of the tube blank P is likely to become caught by the tapering portion 23a when the end portion is open. The blank end portion then fails to close and will be deformed. Preferably, the taper angle X is 16 to 18 deg. In the drawing, the spacing between the slits 23 is shown as being larger than actually. The portion of the slit 23 other than the tapering portion 23a has a depth Y (vertical length) which is not smaller than the width of the blank P.

Figure 7:
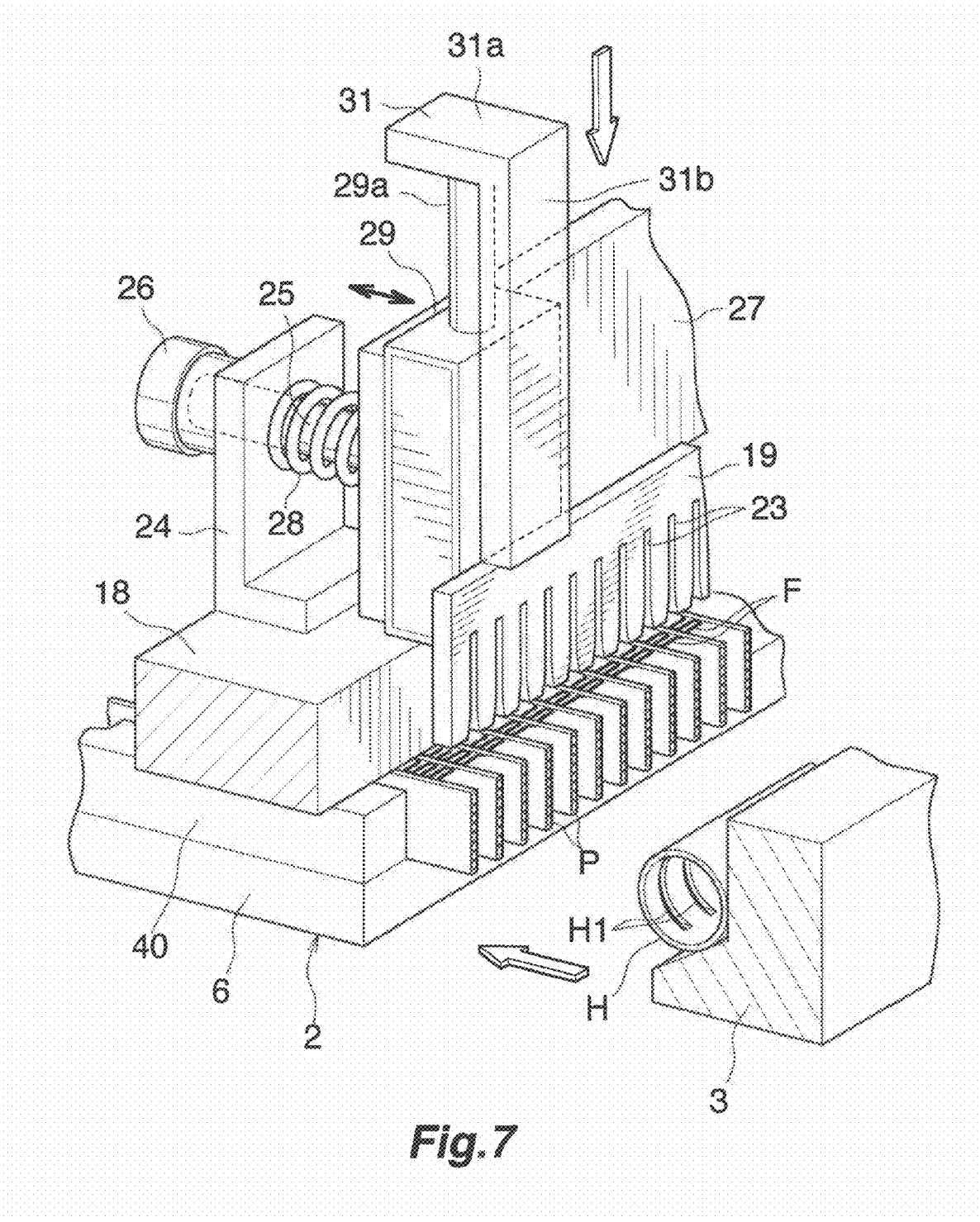
FIG. 7 is an enlarged fragmentary perspective view showing a blank correcting member immediate before it is lowered.

With reference to FIGS. 3 and 7, each blank holding member 18 is fixedly provided with two rod brackets 24 projecting upward from the laterally inner side edge of its upper surface and spaced apart in the forward or rearward direction. A rod 25 laterally extends through each of the rod brackets 24 laterally movably. The rod 25 has a stopper 26 at the laterally inner end thereof. A cylinder mount plate 27 extending from the front rearward has its front and rear end portions fixed to the laterally outer ends of the front and rear rods 25. A compression coil spring 28 (biasing member) is provided around each rod 25 between the rod bracket 24 and the cylinder mount plate 27. A hydraulic cylinder 29 facing upward is attached to each of the front and rear end portions of the mount plate 27 on the laterally outer surface thereof. The piston rod 29a of the cylinder 29 is provided with an inverted generally L-shaped bracket 31 comprising a lateral portion 31a and a downward portion 31b extending downward from the laterally outer end of the lateral portion 31a. The lateral portion 31a of the bracket 31 is fixed to the upper end of the piston rod 29a. The blank correcting member 19 is fixed to the lower end of the downward portion 31b of each bracket 31 so that the blank fitting slits 23 face downward. When the blank holding member 18 is brought to the first position, the advance or retraction of the piston rods 29a of the hydraulic cylinders 29 causes the brackets 31 to move the blank correcting member 19 upward or downward to a noncorrecting position wherein the blanks P are not fitted into the slits 23 or to a correcting position wherein the corresponding ends of all the tube blanks P on the support member 2 are fitted into the respective slits 23.

Figure 4:
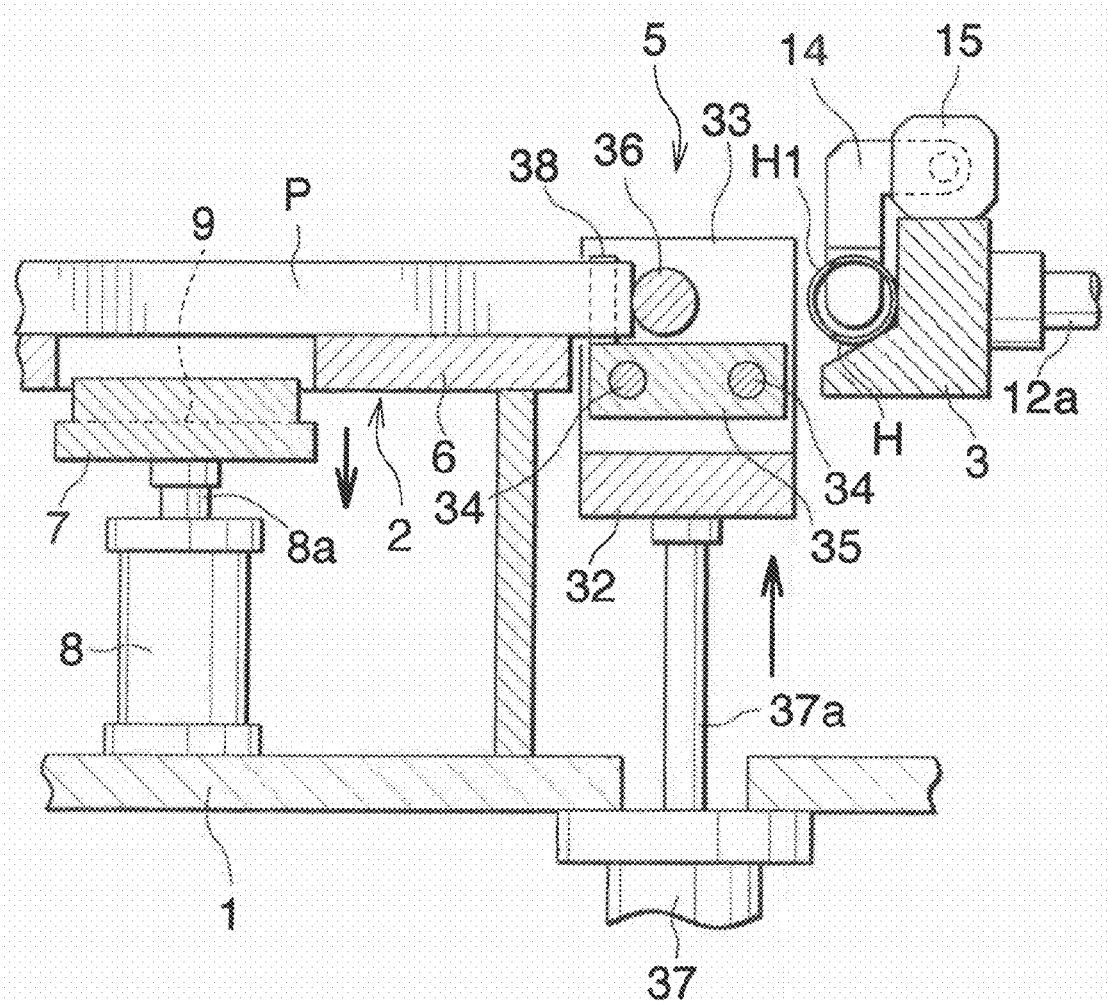
FIG. 4 is an enlarged fragmentary front view partly broken away and showing a blank position adjusting device as raised after heat exchange tube blanks are arranged on a blank guide.
Figure 5:
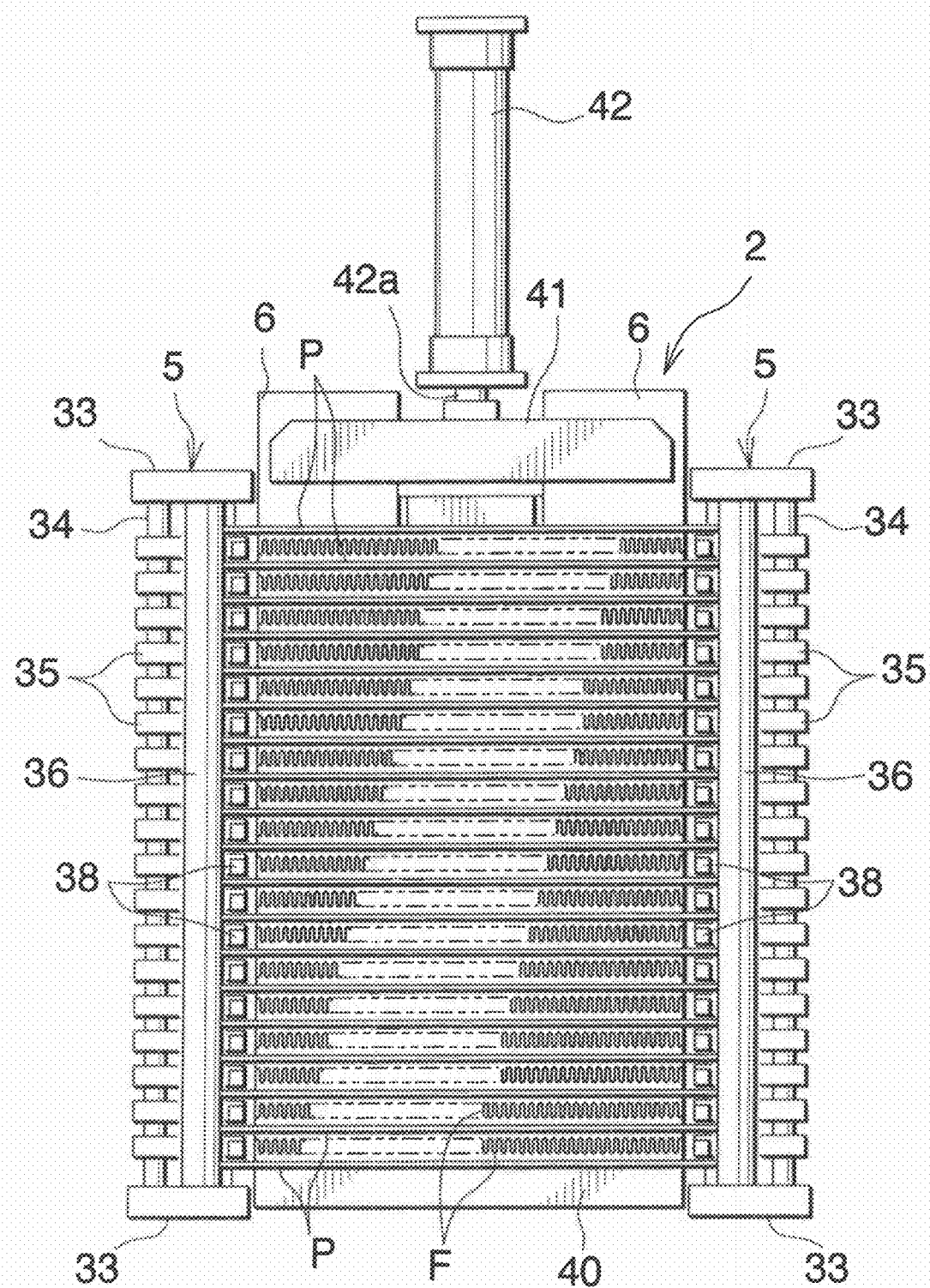
FIG. 5 is a plan view showing corrugated fins as arranged between the heat exchange tube blanks supported on support tables.
Figure 6:
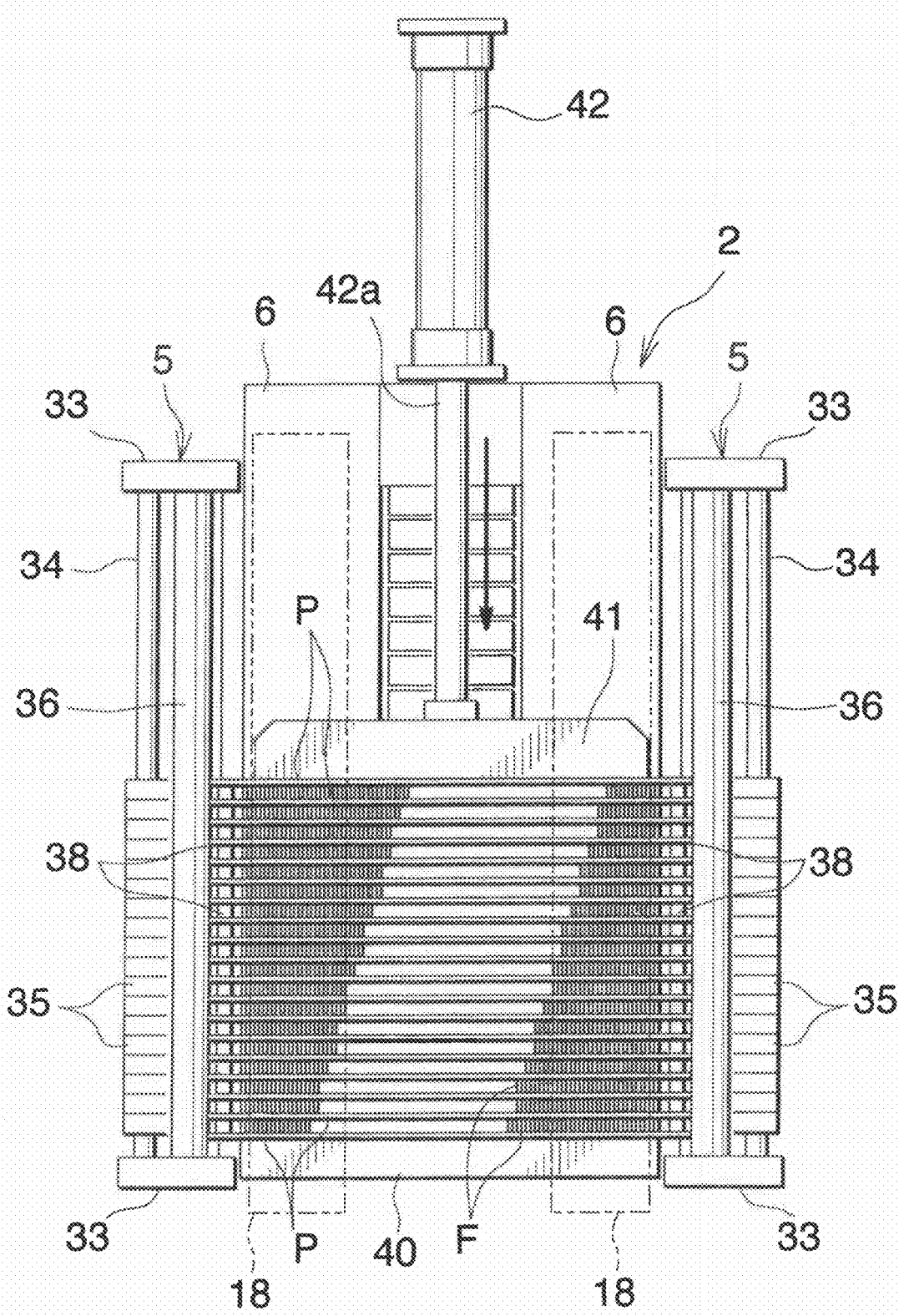
FIG. 6 is a plan view showing the heat exchange tube blanks as held at their opposite ends by blank holding members and moved forward.

With reference to FIGS. 4 to 6, each blank position adjusting device 5 comprises a horizontal base plate 32 extending from the front rearward and movable upward or downward, two upright walls 33 provided respectively at the front and rear ends of the base plate 32, a pair of left and right guide bars 34 extending from the front rearward and connected between the two upright walls 33, a plurality of movable members 35 mounted on the guide bars 34 thereacross and movable forward or rearward along the guide bars 34, and a blank end positioning bar 36 having a circular cross section, positioned above the movable members 35 slightly laterally inwardly of the lateral midportion of the base plate 32 and connected between the upright walls 33. A pair of front and rear hydraulic cylinders 37 each having a piston rod 37a projecting upward beyond the base 1 are attached to the lower side of the base 1 to face upward. The horizontal base plate 32 is fixed to the upper ends of the piston rods 37a. The base plate 32 is moved upward or downward by the advance or retraction of the piston rods 37a of the hydraulic cylinders 37. Each of the movable members 35 is integrally provided with a blank spacing adjusting member 38 upwardly projecting from its upper side and positioned laterally inwardly of the positioning bar 36. The front-to-rear width of the spacing adjusting member 38 is equal to the spacing between each pair of insertion holes H1 of the header H which are adjacent to each other in the forward or rearward direction. When the movable members 35 which are forwardly or rearwardly adjacent to one another are brought into contact with one another, the spacing between forwardly or rearwardly adjacent blank spacing adjusting members 38 is equal to the thickness of the tube blanks P. Although not shown, the blank position adjusting device 5 is provided with a device for moving the movable members 35 as positioned in contact with one another away from one another. When the movable members 35 are separated from one another by this device, the blank spacing adjusting members 38 are each positioned between the adjacent fitting grooves 9 of the blank guide 7 and are spaced apart from one another by a distance larger than the thickness of the tube blanks P.

Using the temporarily assembling apparatus of the construction described above, the headers H, heat exchange tube blanks P and corrugated fins F for a heat exchanger are temporarily assembled in the following manner.

Figure 14:
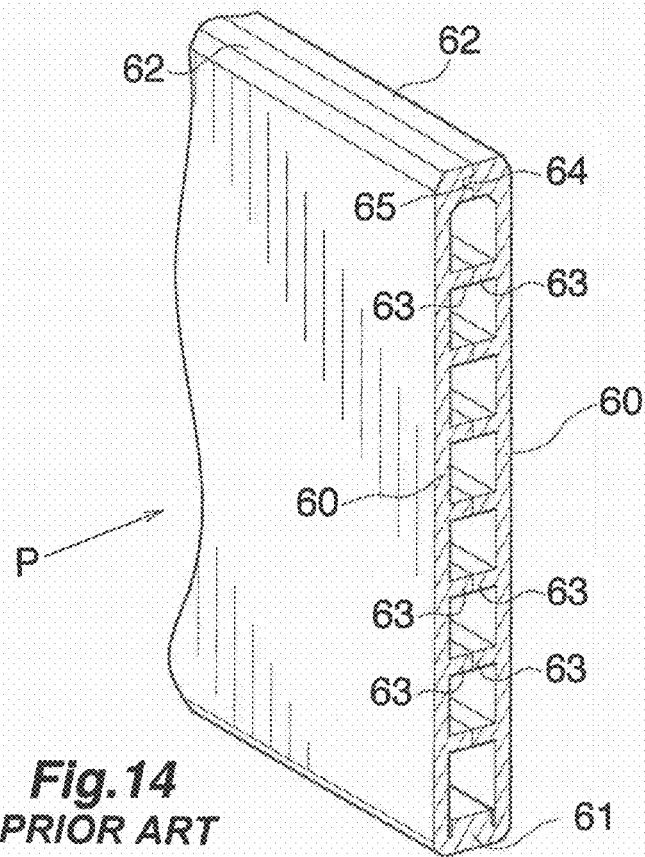
FIG. 14 is a perspective view showing the heat exchange tube blank.

First, the headers H, flat heat exchange tube blanks P and corrugated fins F are prepared. The headers H are tubular and each have a plurality of vertically elongated insertion holes H1 arranged from the front rearward at a spacing for placing the tube blanks P thereinto. The tube blank P has the construction shown in FIG. 14 as already described, and is made from an aluminum brazing sheet having a cladding of brazing material over opposite surfaces of a core by rolling the sheet. The tube blank P is produced by bending the aluminum brazing sheet into the form of a hairpin to obtain a continuous body while paying off the sheet from a roll and cutting the bent continuous body into predetermined lengths. As previously described with reference to the prior art, it is likely that the third portions 62 of the tube blank P will open slightly relative to each other with the ridge 64 slipping out of the furrow 65 at each end of the blank, i.e., the cut end, to give the blank end a thickness T which is larger than the width of the insertion hole H1 of the header H (see FIG. 15).

The present apparatus is in the following state for assembling. The blank guide 7 is in its raised position, with the respective header supports 3 positioned as moved laterally outward. The arms 17 of the blank holding-correcting device 4 at the left are positioned as pivotally moved counterclockwise and the arms 17 of the device 4 at the right are positioned as moved clockwise to bring the blank holding members 18 in their second position. At this time, each blank correcting member 19 is raised relative to the holding member 18 to the noncorrecting position. The blank position adjusting devices 5 are in their lowered position. As this time, the movable members 35 are positioned as separated from one another, and the spacing between the adjacent spacing adjusting members 38 is larger than the thickness of tube blanks P.

In this state, the midportions of flat heat exchange tube blanks P are fitted respectively into all fitting grooves 9 of the blank guide 7, and the headers H are placed on the respective header supports 3 with their insertion holes H1 facing laterally inward (see FIGS. 1 and 2). The tube blanks P have their opposite ends projected laterally outward beyond the respective left and right support tables 6. The blank position adjusting devices 5 are then raised to position the opposite ends of the tube blanks P between the adjacent spacing adjusting members 38, and the opposite ends of all the tube blanks P are positioned in place by the blank end positioning bars 36. The blank guide 7 is then lowered (see FIG. 4), permitting the respective support tables 6 to support the opposite ends of the tube blanks P, and the corrugated fins F are arranged between the respective pairs of adjacent tube blanks P (see FIG. 5). Subsequently, the arms 17 of the holding-correcting device 4 at the left and the arms 17 of the device 4 at the right are moved clockwise and counterclockwise, respectively, to move the blank holding members 18 to their first position and hold all the tube blanks P and corrugated fins F at their opposite ends. Subsequently, the pressure plate 41 is advanced to move the tube blanks P forward until the adjacent movable members 35 come into contact with one another (see FIG. 6). This makes the spacing between the adjacent tube blanks P equal to the spacing between the insertion holes H1 of the headers H. Each pushing plate 14 is then advanced to clamp the header H between the pushing plate 14 and the receiving plate 13. The blank position adjusting devices 5 are thereafter lowered to cause the left and right support tables 6 to support thereon the tube blanks P as arranged from the front rearward in parallel, with their lengthwise direction positioned laterally, with their widthwise direction positioned vertically, and with their opposite ends aligned respectively, and the fins F arranged between the respective pairs of adjacent tube blanks P.

Figure 9:
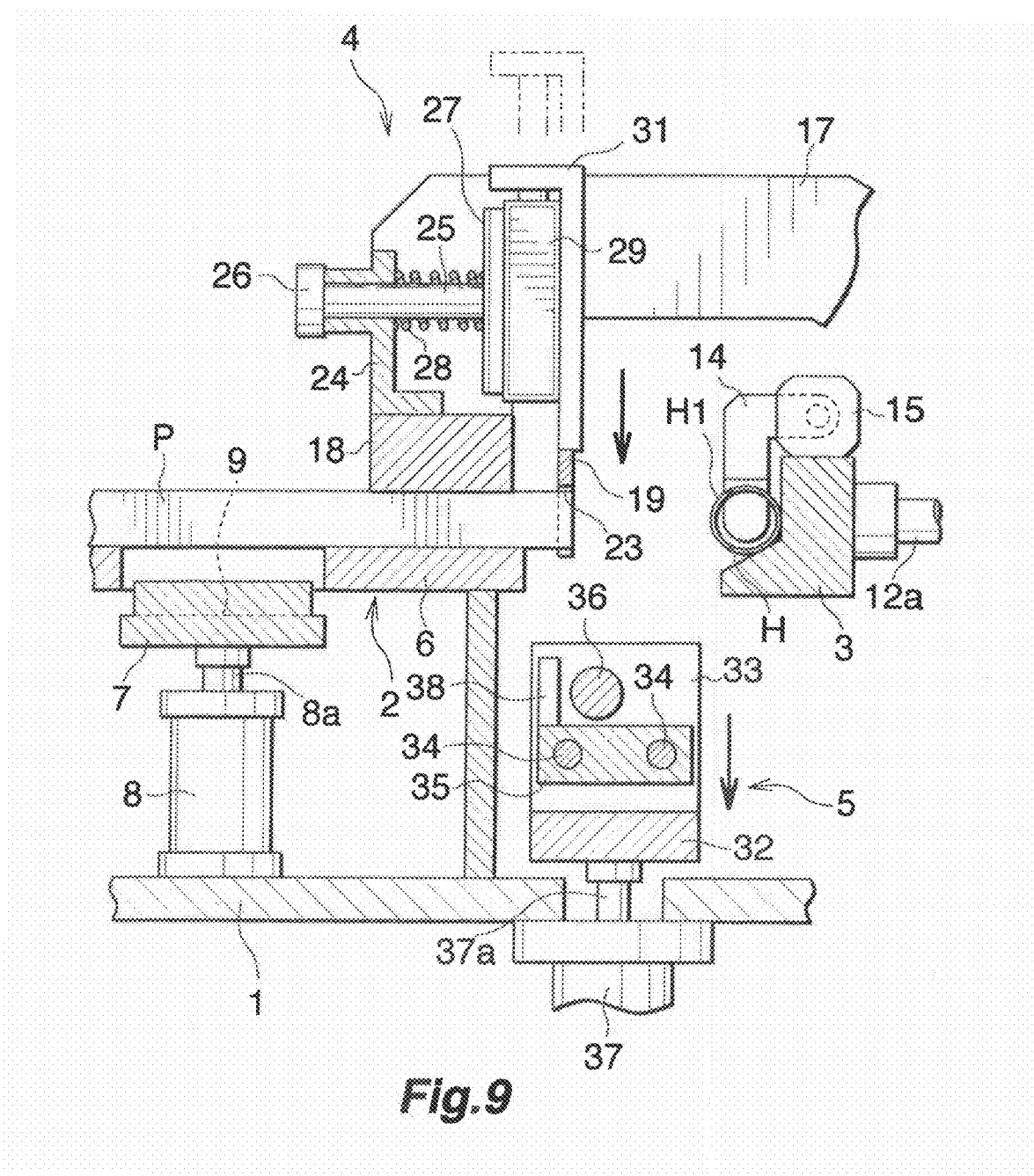
FIG. 9 is an enlarged fragmentary front view partly broken away and showing the end of heat exchange tube blank fitted in the blank fitting slit, with the blank correcting member lowered.
Figure 10:
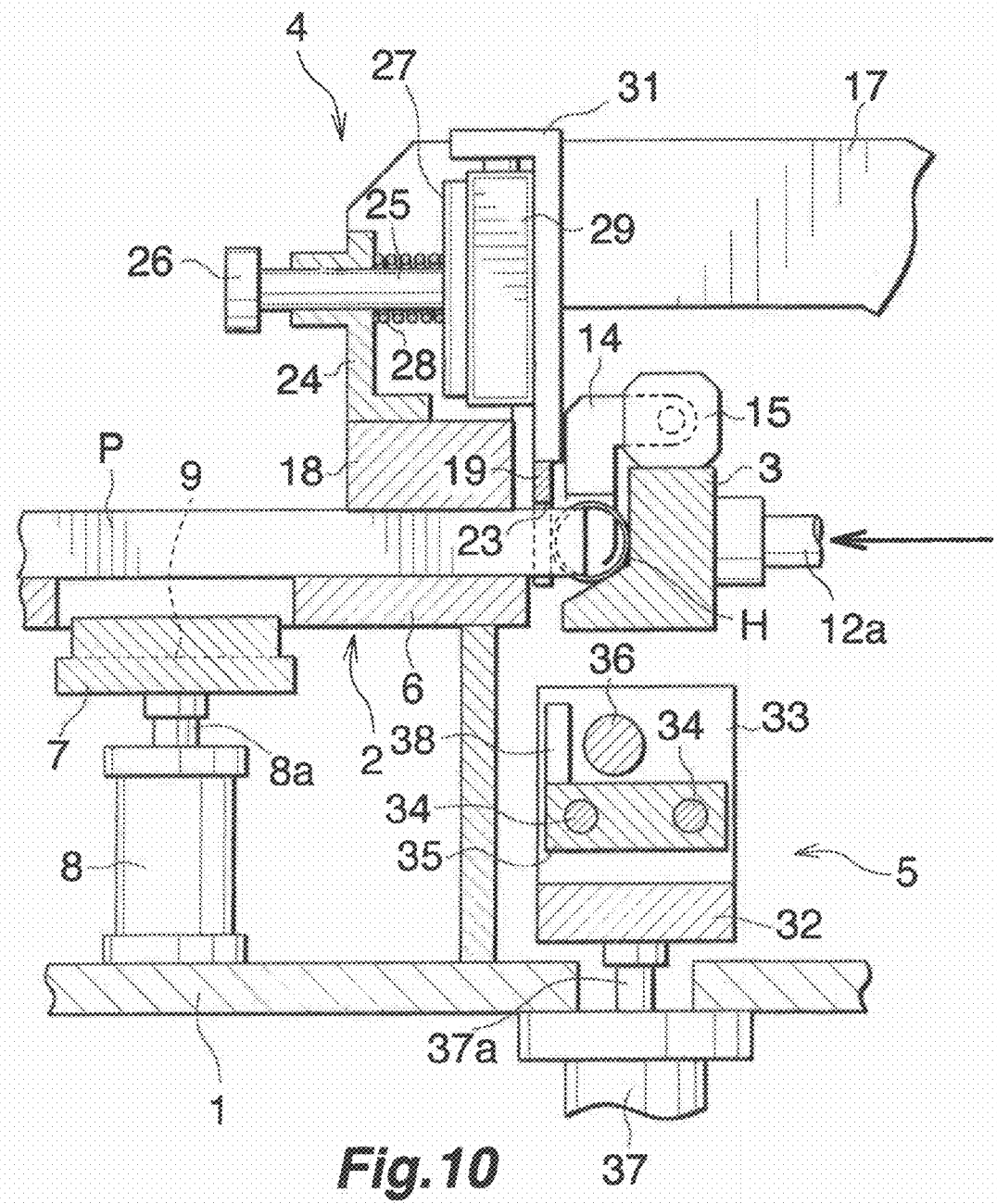
FIG. 10 is an enlarged fragmentary front view partly broken away and showing the end of heat exchange tube blank placed in insertion holes of a header.

Next as shown in FIGS. 7 and 8, the blank correcting members 19 are lowered to fit the opposite ends of all the tube blanks P into the slits 23 (see FIG. 9). Even if the third portions 62 are slightly open relative to each other at each end of the blank P, the blank fitting slit 23 serves to butt the ends of the third portions 62 against each other. Since the open end portion of the slit 23 has the tapering portion 23a, each end of the tube blank P can be smoothly fitted into the slit 23 when the blank P is supported on the tables 6 regardless of whether the third portions 62 are positioned down or up (see FIG. 8).

The header supports 3 are then moved laterally inward to fit the opposite ends of the tube blanks P into the insertion holes H1. At this time, the blank correcting member 19, hydraulic cylinder 29 and cylinder mount plate 27 are moved laterally inward by being pushed by each header H against the force of the spring 28, so that the ends of the tube blanks P can be placed into the insertion holes H1 free of trouble. (see FIG. 10).

Figure 11:
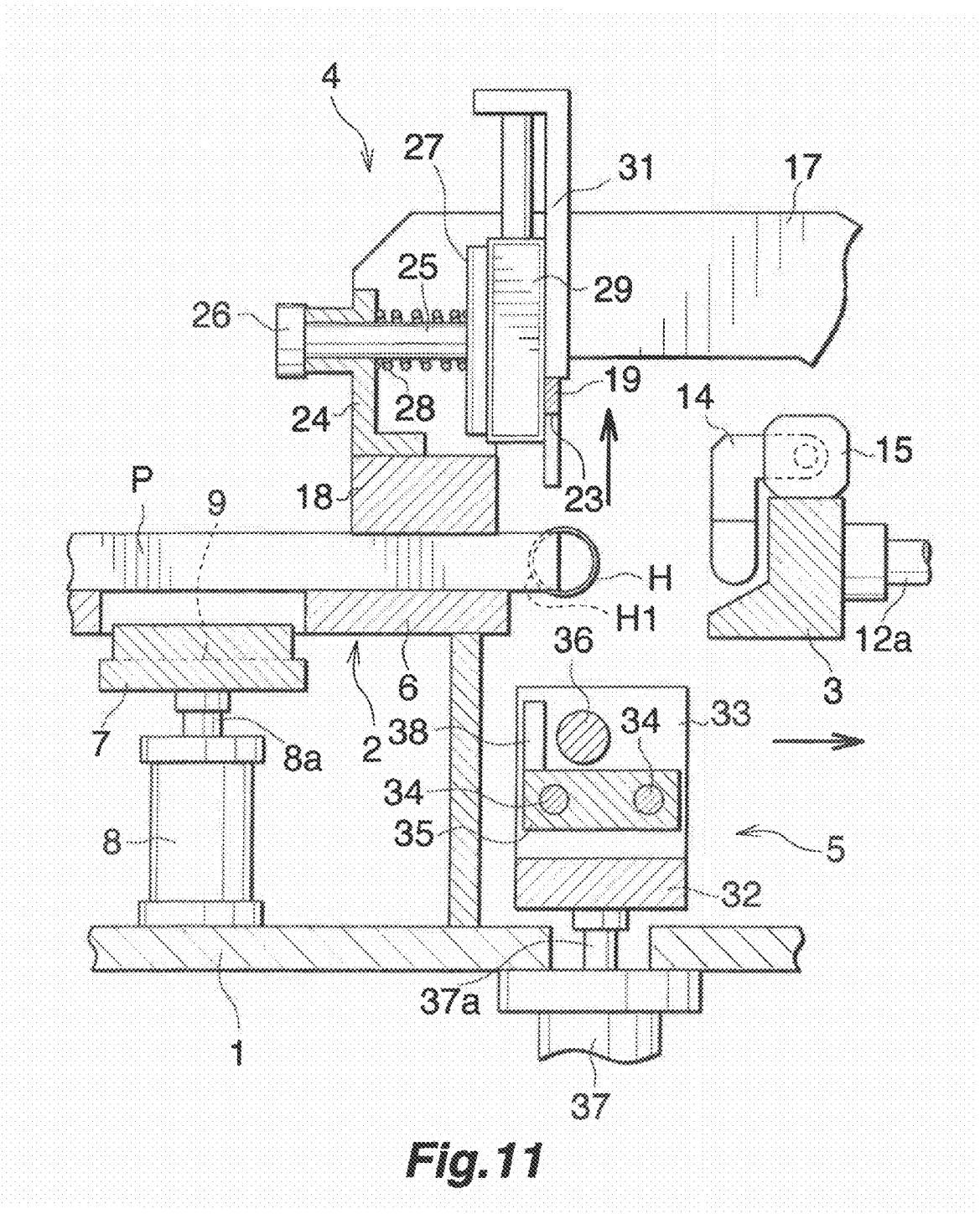
FIG. 11 is an enlarged front view partly broken away and showing the tube blank correcting member as raised and a header support as moved laterally outward.
Figure 12:
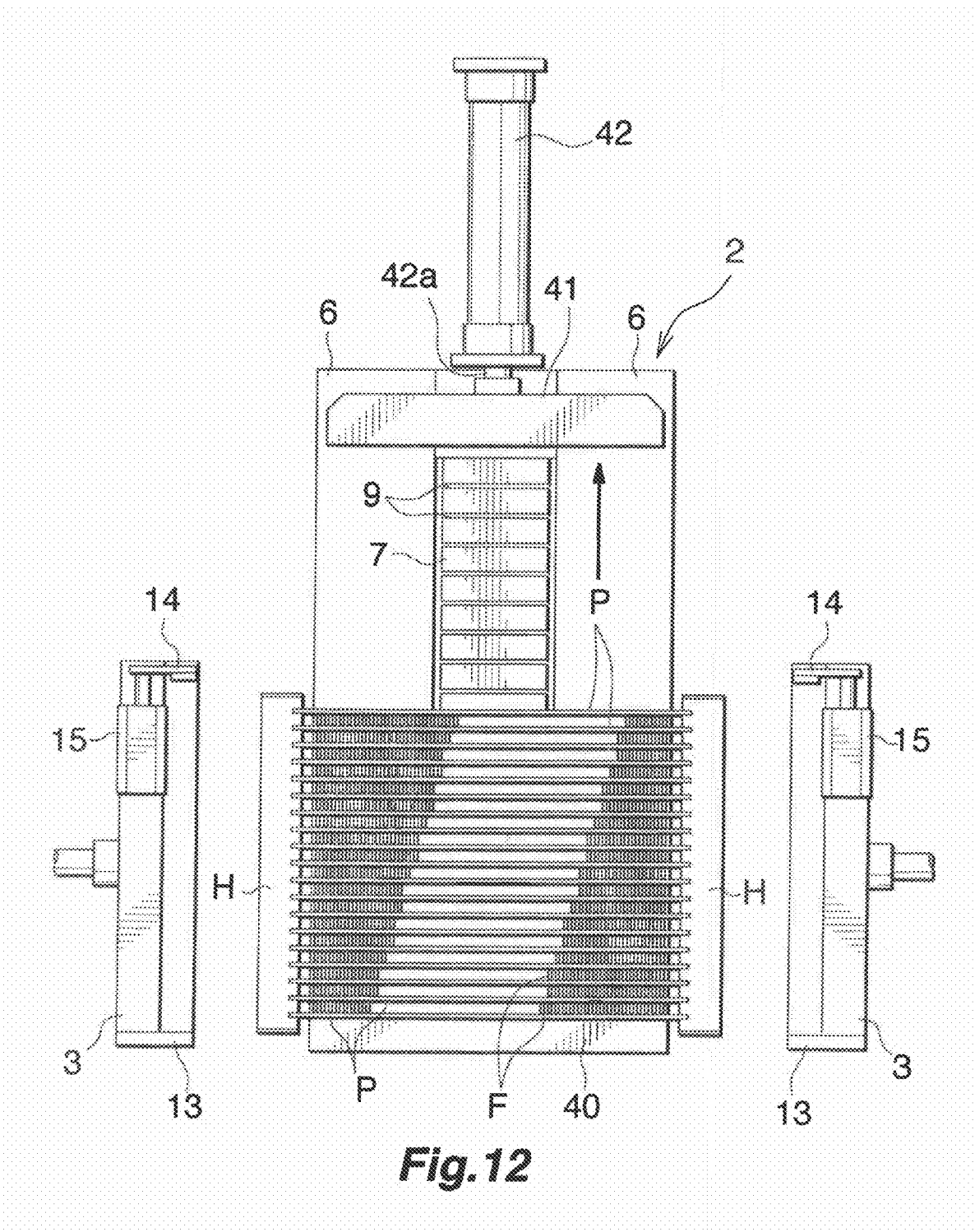
FIG. 12 is a plan view showing headers, heat exchange tube blanks and corrugated fins as temporarily assembled on a support member.

The pushing plates 14 are then retracted, the header supports 3 are moved laterally outward, and the blank correcting members 19 are thereafter raised (see FIG. 11). At this time, the force of each compression coil spring 28 returns the blank correcting member 19, hydraulic cylinder 29 and cylinder mount plate 27 to their original positions. The pressure plates 41 are thereafter retracted, the arms 17 of the holding-correcting device 4 at the left and the arms 17 of the device 4 at the right are moved counterclockwise and clockwise, respectively to move the blank holding members 18 to their second position. In this way, the headers H, tube blanks P and corrugated fins F are temporarily assembled (see FIG. 12).

Figure 13:
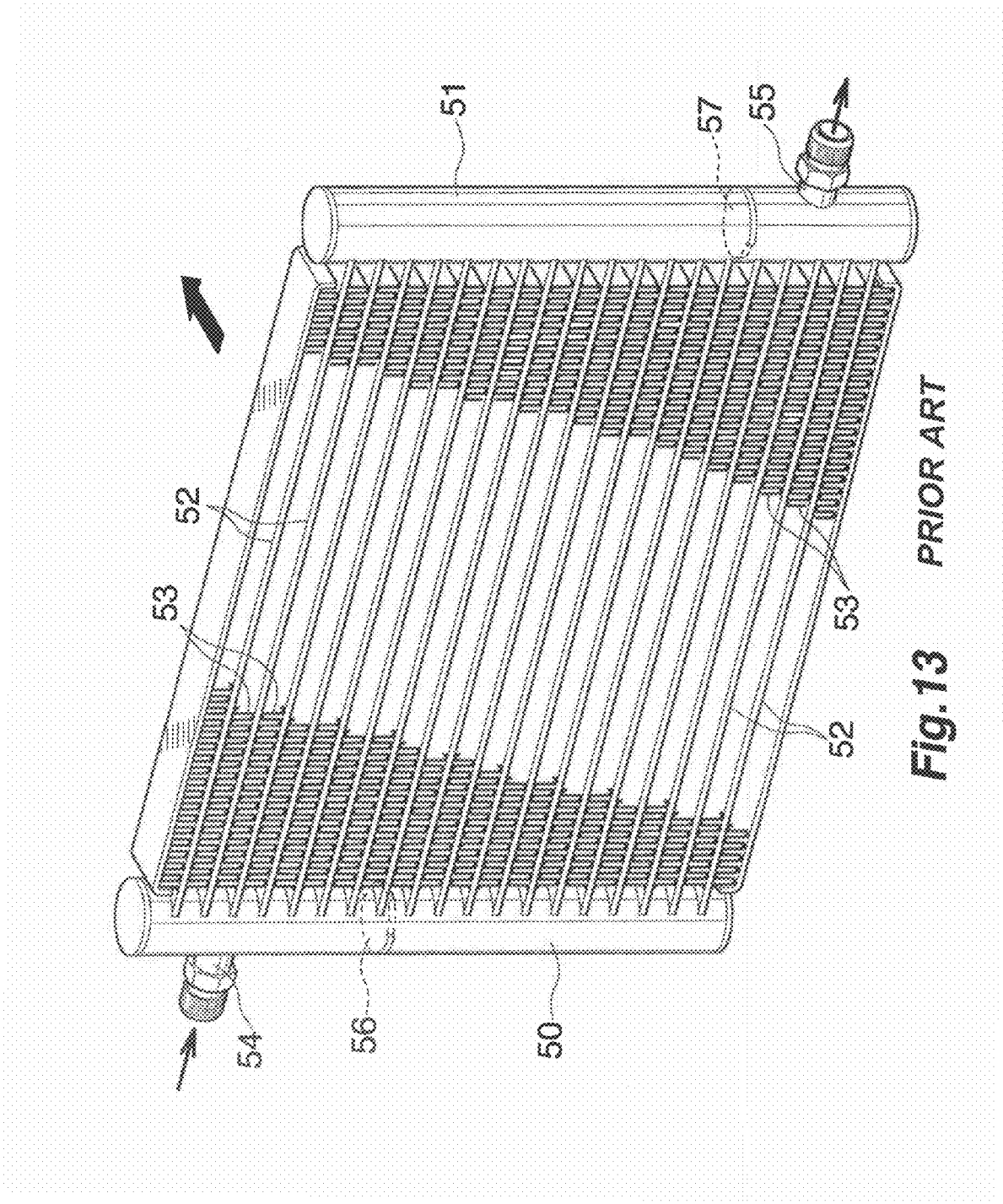
FIG. 13 is a perspective view showing a motor vehicle condenser.

The motor vehicle air conditioner condenser shown in FIG. 13 is fabricated by temporarily assembling the components as described above, thereafter inserting partitions 56, 57 into partition inserting holes formed in the headers H, and collectively brazing the headers H to the tube blanks P, the headers H to the partition 56 or 57, the third portions 62 of each of the tube blanks P to each other, the opposed ridges 63 in each pair of the blanks P to each other and each pair of adjacent tube blanks P to the fin therebetween. The heat exchange tube blanks P provide respective flat heat exchange tubes 52.

The condenser thus fabricated provides a refrigeration cycle along with a compressor and an evaporator, and the cycle is installed in a motor vehicle as a vehicle air conditioner.

In the foregoing embodiments, other fluid pressure cylinders, such as air cylinders, can be used in place of all the hydraulic cylinders.

Figure 16:
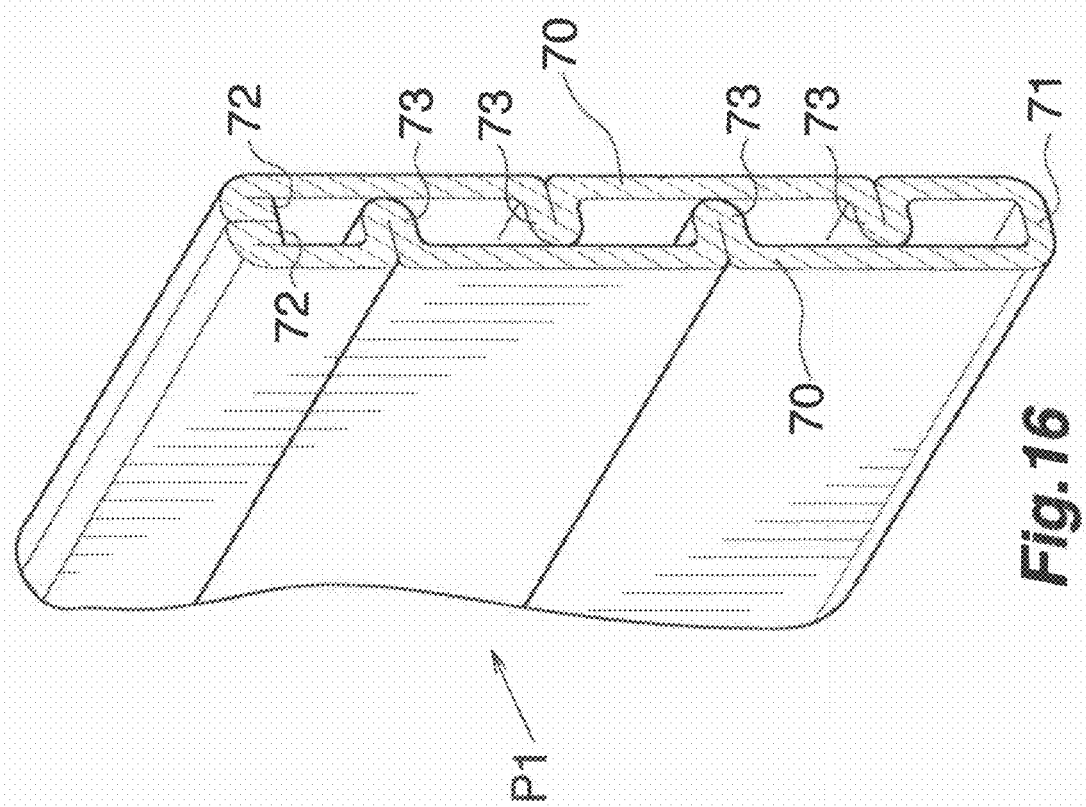
FIG. 16 is a perspective view showing a modified heat exchange tube blank.

The temporarily assembling apparatus of the present invention is usable also when the flat heat exchange tube blank shown in FIG. 16 is used.

With reference to FIG. 16, the flat heat exchange tube blank P1 is made from a metal plate which has two first portions 70 for making flat walls, a second portion 71 interconnecting the two first portions 70 for making one of two side walls, two third portions 72 formed by folding the respective first portions 70 each at a side edge portion opposite to the second portion 71 for making the other side wall, and a plurality of ridges 73 formed by bending each first portion 70 at positions spaced apart along the widthwise direction thereof and projecting in the same direction as the third portion 72 provided by the same first portion, by bending the metal plate to the shape of a hairpin at the second portion 71 to place the third portions 72 end to end and to bring the ridges 73 of each of the first portions 70 into contact with the other first portion 70. Before the metal plate is bent into the tube blank P1, the ridges 73 of one of the first portions 70 and the ridges 73 of the other first portion 70 are positioned asymmetric about the center line with respect to the direction of width of the metal plate.

Figure 17:
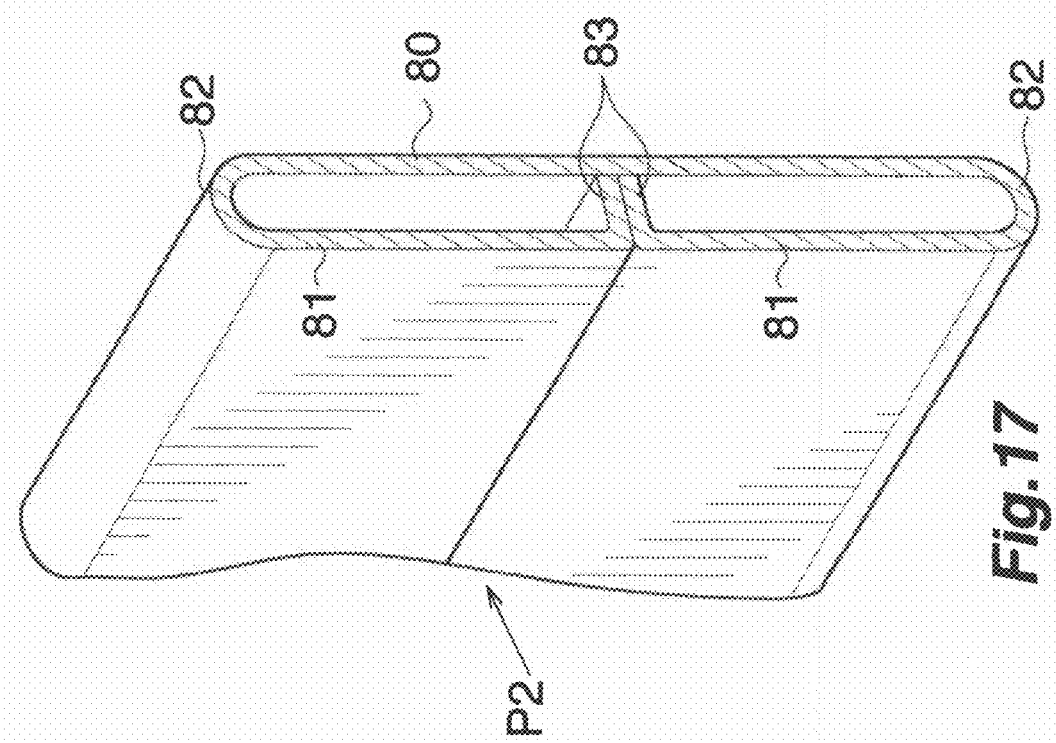
FIG. 17 is a perspective view showing another modification of heat exchange tube blank.

The temporarily assembling apparatus of the present invention is further usable also when the flat heat exchange tube blank shown in FIG. 17 is used.

With reference to FIG. 17, the flat heat exchange tube blank P2 is made from a metal plate which has a single first portion 80 for making one of two flat walls, two second portions 81 approximately one-half of the first portion 80 in width for making the other flat wall, two third portions 82 for connecting the first portion 80 to the respective second portions 81 for making two side walls, and two fourth portions 83 upstanding from the respective second portions 81 each at a side edge thereof opposite to the third portion 82, by bending the metal plate at the two third portions 82 to butt the fourth portion providing side edges of the second portions 81 against each other and to fit the fourth portions 83 to each other.

The metal plates for making the tube blanks P1, P2 shown in FIGS. 16 and 17 are made of an aluminum brazing sheet having a cladding of brazing material on opposite sides.

The flat heat exchange tube blanks for which the assembling apparatus of the invention is usable are not limited to those described above; the apparatus is usable also when flat heat exchange tube blanks are used which are made of an extrudate, i.e., by cutting an elongated extrudate into predetermined lengths. The tube blank thus produced is likely to be deformed at the cut end by cutting and can not always be placed into the insertion hole of the header. The temporarily assembling apparatus of the invention is usable also when flat heat exchange tube blanks are used each of which comprises two platelike components in combination as disclosed in the publication of JP-A No. 1994-281373, Para. 0045 to 0054 and FIGS. 13 and 14. These tube blanks are produced by cutting an elongated combination of two platelike components into predetermined lengths. The tube blank is likely to be deformed at the cut end by cutting and can not always be placed into the insertion hole of the header. Furthermore, the temporarily assembling apparatus of the invention is usable also when flat heat exchange tube blanks are used which are made of an electro-resistance welded tube or which are made by bending a plate. These tube blanks are likely to have a bulging widthwise intermediate portion, or to be deformed at cut ends by cutting since they are produced by cutting an elongated tubular body into predetermined lengths. In either case, such tube blanks are not always placeable into insertion holes of headers.

The tube blank correcting member of the invention is usable also in the temporarily assembling apparatus disclosed in the publication of JP-A No. 1993-7958. In this case, the correcting member is provided at a level above the guide, as positioned laterally outwardly of the guide and made movable upward or downward.

Figure 18:
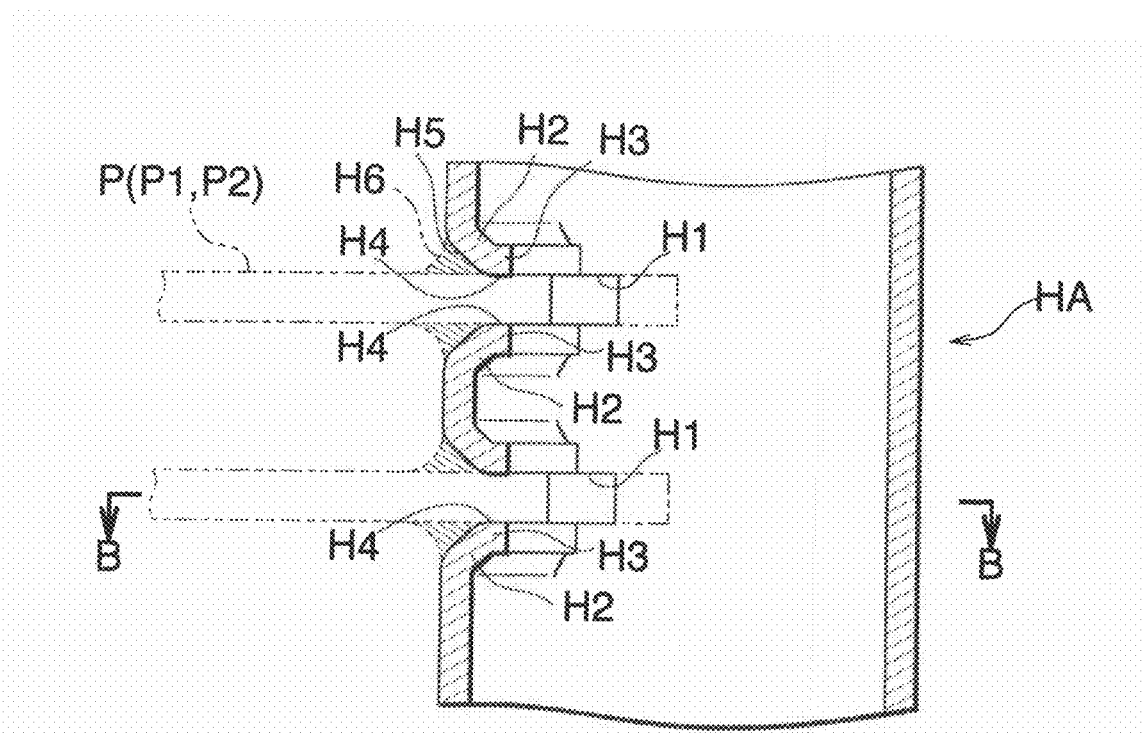
FIG. 18 is an enlarged fragmentary view in vertical section showing a modification of header.
Figure 19:
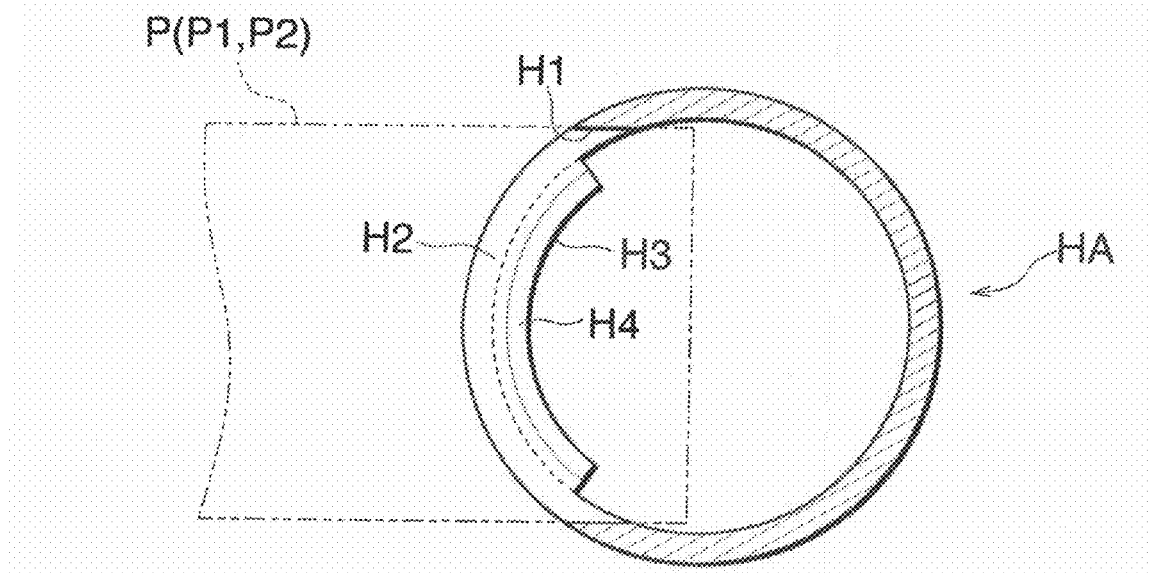
FIG. 19 is a view in section taken along the line B-B in FIG. 18.

FIGS. 18 and 19 show a heat exchanger header which can be temporarily assembled by the apparatus of the invention.

With reference to FIGS. 18 and 19, two side edges defining an insertion hole H1 in the header HA and extending widthwise of the hole are each inclined inwardly of the header HA toward the other side edge to provide two tapering portions H2 integrally with the header, and the inner end of each tapering portion H2 is integrally provided with a guide H3. The opposed faces H4 of the two guides H3 are each positioned on a plane orthogonal to the center line of the header HA. The header HA is covered with a brazing material layer over the inner and outer peripheral surfaces thereof. In the case of this header HA, a heat exchange tube blank P, P1 or P2 can be placed into the insertion hole H1 smoothly. When the header HA is brazed to the tube blank P, P1 or P2 after temporary assembling, a melt of brazing material collects in a clearance H5 between the tapering portion H2 and the blank P, P1, or P2, consequently forming a fillet H6 in the clearance as indicating by hatching in FIG. 18. The heat exchange tube 52 produced can therefore be brazed to the header HA with an improved strength.

INDUSTRIAL APPLICABILITY

The present invention provides a temporarily assembling apparatus for use in fabricating heat exchangers which comprise a pair of headers arranged in parallel and spaced apart from each other, a plurality of flat heat exchanger tubes arranged in parallel between the headers and brazed at opposite ends to the respective headers with the tube ends placed into respective insertion holes formed in the headers, and fins each arranged between and brazed to each pair of adjacent heat exchange tubes, and which are useful, for example, as condensers or evaporators for motor vehicle air conditioners, motor vehicle oil coolers and motor vehicle radiators. The apparatus is adapted for use in temporarily assembling the headers, flat heat exchange tube blanks and the fins into a unit to be brazed.

The invention claimed is:

1. An apparatus for temporarily assembling a heat exchanger, comprising:
   a support member having a support surface with opposite side portions, the support member being configured to support, on the support surface, a plurality of heat exchanger tube blanks positioned in parallel to one another and extending in a longitudinal direction such that the heat exchanger tube blanks each have an end portion extending beyond a respective side portion of the support member and aligned with the end portion of an adjacent heat exchanger tube blank;
   a plurality of header supports configured to support headers, the header supports being positioned longitudinally outward of respective opposite side portions of the support member and movable with respect to the support member in the longitudinal direction; and
   a plurality of tube blank correcting members configured to correct dimension of the heat exchanger tube blanks, each of the tube blank correcting members having a plurality of blank fitting slits formed along a side edge thereof at a spacing corresponding to a spacing of heat exchange tubes of the heat exchanger,
   wherein each of the tube blank correcting members is movable between a correcting position and a noncorrecting position such that, when the tube blank correcting member is at the correcting position, the end portions of the heat exchanger tube blanks are fitted into the blank fitting slits, and when the tube blank correcting member is at the noncorrecting position, the heat exchanger tube blanks are not fitted into the blank fitting slits, and the tube blank correcting members are movable in the longitudinal direction of the heat exchange tube blanks from the end portions toward center portions of the heat exchange tube blanks such that the headers supported by the header supports are connected with the end portions of the heat exchanger tube blanks.

2. The apparatus according to claim 1, wherein each of the blank fitting slits has an opening formed such that a width of the opening is larger than a maximum thickness of the heat exchange tube blank, and the width of the opening is gradually increased toward an end portion of each of the blank fitting slits.

3. The apparatus according to claim 1, wherein each of the blank fitting slits has an opening whose width is gradually increased toward an end portion of each of the blank fitting slits such that a tapering portion having a taper angle of 10 to 20 deg is formed.

4. The apparatus according to claim 3, wherein the blank fitting slit has a portion other than the tapering portion and having a depth not smaller than the width of the heat exchanger tube blank.

5. The apparatus according to claim 1, further comprising a plurality of biasing members each configured to apply a biasing force to the tube blank correcting member at the correcting position, wherein the biasing member is configured to apply the biasing force in a direction from the center portion toward the end portion of the heat exchanger tube blanks where the tube blank correcting member is connected.

6. The apparatus according to claim 1, wherein each of the tube blank correcting members is provided on a tube blank holding member, the tube blank holding member is movable between a first position and a second position, the tube blank holding member at the first position holds the tube blank correcting member adjacent to the end portion of the heat exchange tube blanks, the tube blank holding member at the second position is away from the heat exchange tube blanks, and when the tube blank holding member is at the first position, the tube blank correcting member is movable downward relative to the tube blank holding member to reach the correcting position, and the blank correcting member is movable upward relative to the tube blank holding member to reach the noncorrecting position.

7. The apparatus according to claim 6, wherein the tube blank holding member is fixed to a free end of an arm, and the holding member is movable between the first position and the second position by a pivotal movement of the arm.

8. A method for temporarily assembling a heat exchanger, comprising:
   providing an apparatus comprising: a support member having a support surface with opposite side portions, the support member being configured to support, on the support surface, a plurality of heat exchanger tube blanks positioned in parallel to one another and extending in a longitudinal direction such that the heat exchanger tube blanks each have an end portion extending beyond a respective side portion of the support member and aligned with the end portion of an adjacent heat exchanger tube blank; a plurality of header supports configured to support headers, the header supports being positioned longitudinally outward of respective opposite side portions of the support member and movable with respect to the support member in the longitudinal direction; and a plurality of tube blank correcting members configured to correct dimension of the heat exchanger tube blanks, each of the tube blank correcting members having a plurality of blank fitting slits formed along a side edge thereof at a spacing corresponding to a spacing of heat exchange tubes of the heat exchanger, wherein each of the tube blank correcting members is movable between a correcting position and a noncorrecting position such that, when the tube blank correcting member is at the correcting position, the end portions of the heat exchanger tube blanks are fitted into the blank fitting slits, and when the tube blank correcting member is at the noncorrecting position, the heat exchanger tube blanks are not fitted into the blank fitting slits, and the tube blank correcting members are movable in the longitudinal direction of the heat exchange tube blanks from the end portions toward center portions of the heat exchange tube blanks such that the headers supported by the header supports are connected with the end portions of the heat exchanger tube blanks;

placing a plurality of heat exchange tube blanks on the support surface of the support member such that the heat exchanger tube blanks are positioned in parallel to one another and extend in a longitudinal direction, and that the heat exchanger tube blanks each have an end portion extending beyond the respective side portion of the support member and aligned with the end portion of an adjacent heat exchanger tube blank;

placing a plurality of headers on the header supports, respectively;

moving each of the tube blank correcting members to the correcting position to fit the end portions of the heat exchanger tube blanks on the support member into the blank fitting slits, respectively; and moving the header supports laterally toward the end portions of the heat exchanger tube blanks to connect the headers with the end portions of the heat exchanger tube blanks.

9. The method according to claim 8, wherein each of the heat exchange tube blanks is produced by a process comprising: providing a metal plate having first portions, a second portion interconnecting the first portions, and third portions projecting from the first portions, respectively; and bending the metal plate in a shape of a hairpin at the second portion such that the first portions form flat walls of heat exchange tubes, and the third portions are butted against each other.

10. The method according to claim 9, wherein the metal plate is produced by a process comprising: providing an aluminum brazing sheet having brazing material layers on opposite surfaces thereof; and rolling the aluminum brazing sheet.

11. A process for producing a heat exchanger, comprising: temporarily assembling a heat exchanger by providing an apparatus comprising: a support member having a support surface with opposite side portions, the support member being configured to support, on the support surface, a plurality of heat exchanger tube blanks positioned in parallel to one another and extending in a longitudinal direction such that the heat exchanger tube blanks each have an end portion extending beyond a respective side portion of the support member and aligned with the end portion of an adjacent heat exchanger tube blank; a plurality of header supports configured to support headers, the header supports being positioned longitudinally outward of respective opposite side portions of the support member and movable with respect to the support member in the longitudinal direction; and a plurality of tube blank correcting members configured to correct dimension of the heat exchanger tube blanks, each of the tube blank correcting members having a plurality of blank fitting slits formed along a side edge thereof at a spacing corresponding to a spacing of heat exchange tubes of the heat exchanger, wherein each of the tube blank correcting members is movable between a correcting position and a noncorrecting position such that, when the tube blank correcting member is at the correcting position, the end portions of the heat exchanger tube blanks are fitted into the blank fitting slits, and when the tube blank correcting member is at the noncorrecting position, the heat exchanger tube blanks are not fitted into the blank fitting slits, and the tube blank correcting members are movable in the longitudinal direction of the heat exchange tube blanks from the end portions toward center portions of the heat exchange tube blanks such that the headers supported by the header supports are connected with the end portions of the heat exchanger tube blanks;

placing a plurality of heat exchange tube blanks on the support surface of the support member such that the heat exchanger tube blanks are positioned in parallel to one another and extend in a longitudinal direction, and that the heat exchanger tube blanks each have an end portion extending beyond the respective side portion of the support member and aligned with the end portion of an adjacent heat exchanger tube blank;

placing a plurality of headers on the header supports, respectively; moving each of the tube blank correcting members to the correcting position to fit the end portions of the heat exchanger tube blanks on the support member into the blank fitting slits, respectively; and moving the header supports laterally toward the end portions of the heat exchanger tube blanks to connect the headers with the end portions of the heat exchanger tube blanks; and brazing the headers and the heat exchange tube blanks.

* * * * *